US011862377B2

(12) United States Patent
Tan et al.

(10) Patent No.: US 11,862,377 B2
(45) Date of Patent: Jan. 2, 2024

(54) TRANSFORMER AND POWER SUPPLY

(71) Applicant: HUAWEI TECHNOLOGIES CO., LTD., Shenzhen (CN)

(72) Inventors: Wei Tan, Vienna (AT); Jiebin Cheng, Dongguan (CN); Peng Xian, Sao Paulo (BR); Qiong Ye, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 369 days.

(21) Appl. No.: 17/345,023

(22) Filed: Jun. 11, 2021

(65) Prior Publication Data

US 2021/0304945 A1 Sep. 30, 2021

Related U.S. Application Data

(63) Continuation of application No. PCT/CN2019/121716, filed on Nov. 28, 2019.

(30) Foreign Application Priority Data

Dec. 11, 2018 (CN) .......................... 201811510768.8

(51) Int. Cl.
*H01F 27/24* (2006.01)
*H02M 3/335* (2006.01)
(Continued)

(52) U.S. Cl.
CPC .............. *H01F 27/24* (2013.01); *H01F 27/28* (2013.01); *H01F 41/06* (2013.01); *H02M 3/003* (2021.05);
(Continued)

(58) Field of Classification Search
CPC .......... H01F 27/24; H01F 27/28; H01F 41/06; H01F 3/10; H01F 27/255;
(Continued)

(56) References Cited

U.S. PATENT DOCUMENTS 3,467,930 A   9/1969   Glover
3,768,055 A   10/1973  Oliver
(Continued)

FOREIGN PATENT DOCUMENTS

CN      1243357 C    2/2006
CN      1257518 C    5/2006
(Continued)

OTHER PUBLICATIONS

Ranjram, Mike K et al., Variable-Inverter-Rectifier-Transformer: A Hybrid Electronic and Magnetic Structure Enabling Adjustable High Step-Down Conversion Ratios, MIT, 2017 IEEE Workshop on Control and Modeling for Power Electronics (COMPEL 17), Jul. 9-12, 2017, 9 pages.
(Continued)

*Primary Examiner* — Yusef A Ahmed
(74) *Attorney, Agent, or Firm* — Rimon PC

(57) ABSTRACT

This application relates to the field of electronic technologies, and discloses a transformer and a power supply, to provide a magnetic cylinder distribution structure of a magnetic core while reducing a winding loss by using fractional turn, where the magnetic cylinder distribution structure of the magnetic core is conveniently to implement, thereby reducing product costs. The transformer includes a magnetic core, where the magnetic core includes a first magnetic cylinder and a second magnetic cylinder. One end of the first magnetic cylinder is coupled to one end of the second magnetic cylinder and the other end of the first magnetic cylinder is coupled to the other end of the second magnetic cylinder, to form an annulus.

9 Claims, 19 Drawing Sheets

(51) Int. Cl.
*H01F 27/28* (2006.01)
*H01F 41/06* (2016.01)
*H02M 3/00* (2006.01)

(52) U.S. Cl.
CPC ....... *H02M 3/335* (2013.01); *H02M 3/33576* (2013.01)

(58) Field of Classification Search
CPC ........... H01F 2027/408; H01F 27/2804; H01F 27/2823; H01F 27/40; H01F 27/306; H02M 3/335; H02M 1/0048; H02M 3/003; H02M 3/33576; H02M 1/00; Y02B 70/10
See application file for complete search history.

(56) References Cited

U.S. PATENT DOCUMENTS

| | | | |
|---|---|---|---|
| 5,999,078 A | 12/1999 | Herbert | |
| 6,348,848 B1 | 2/2002 | Herbert | |
| 7,332,993 B1 | 2/2008 | Nussbaum | |
| 10,886,046 B2* | 1/2021 | Njiende | H01F 27/06 |
| 2002/0075712 A1* | 6/2002 | Jitaru | H01F 30/10 336/170 |
| 2005/0237143 A1 | 10/2005 | Nakagawa et al. | |
| 2005/0270745 A1* | 12/2005 | Chen | H01F 27/2804 361/707 |
| 2009/0231885 A1* | 9/2009 | Won | H01F 27/38 336/212 |
| 2013/0141878 A1* | 6/2013 | Wu | H01F 27/2866 361/748 |
| 2013/0301308 A1* | 11/2013 | Hosotani | H02M 3/3381 363/21.03 |
| 2014/0085035 A1* | 3/2014 | Kim | H01F 27/24 336/212 |
| 2016/0098058 A1 | 4/2016 | Morehouse et al. | |
| 2017/0331371 A1 | 11/2017 | Parto | |
| 2018/0191235 A1* | 7/2018 | Chen | H01F 27/2804 |
| 2018/0350513 A1* | 12/2018 | Murakami | H02M 3/01 |
| 2019/0043660 A1* | 2/2019 | Jin | H01F 27/24 |
| 2019/0043661 A1* | 2/2019 | Jin | H01F 27/24 |
| 2019/0089197 A1* | 3/2019 | Mao | H01F 27/363 |
| 2019/0362885 A1* | 11/2019 | Lu | H02M 3/285 |
| 2020/0381176 A1* | 12/2020 | Kolar | H02M 3/33569 |
| 2021/0249174 A1* | 8/2021 | Brockschmidt, Jr. | H01F 41/0206 |
| 2022/0084734 A1* | 3/2022 | Lai | H02M 3/33561 |
| 2022/0157516 A1* | 5/2022 | Liang | H02M 3/33576 |
| 2022/0200446 A1* | 6/2022 | Tan | H01F 27/40 |
| 2022/0238268 A1* | 7/2022 | Wang | H01F 27/2823 |
| 2022/0375678 A1* | 11/2022 | Drofenik | H02M 3/33584 |

FOREIGN PATENT DOCUMENTS

| | | |
|---|---|---|
| CN | 200983303 Y | 11/2007 |
| CN | 101174502 A | 5/2008 |
| CN | 201075328 Y | 6/2008 |
| CN | 102064699 A | 5/2011 |
| CN | 103762853 A | 4/2014 |
| CN | 103986343 A | 8/2014 |
| CN | 203774045 U | 8/2014 |
| CN | 104025217 A | 9/2014 |
| CN | 203872069 U | 10/2014 |
| CN | 206259243 U | 6/2017 |
| CN | 206401141 U | 8/2017 |
| CN | 107887138 A | 4/2018 |
| CN | 107895636 A | 4/2018 |
| CN | 109686538 A | 4/2019 |
| KR | 20090128260 A | 12/2009 |

OTHER PUBLICATIONS

Sigi Li et al., A Half-Turn Transformer With Symmetry Magnetic Flux for High-Frequency-Isolated DC/DC Converters, IEEE Transactions on Power Electronics, vol. 33, No. 8, Aug. 2018, 4 pages.
Lloyd H. Dixon et al., How to Design a Transformer With Fractional Turns, TI Magnetics Design Handbook, Topic R6 , 2000, 9 pages.
Iyer K.V. et al: "A Half-Turn Winding for Compact, High-Current, High-Turns-Ratio, Low-Leakage-Inductance Transformer",2017 IEEE Energy Conversion Congress and Exposition (ECCE), IEEE, Oct. 1, 2017, XP033247232, total 6 pages.

* cited by examiner

TRANSFORMER AND POWER SUPPLY

CROSS-REFERENCE TO RELATED APPLICATIONS

This application is a continuation of International Application No. PCT/CN2019/121716, filed on Nov. 28, 2019, which claims priority to Chinese Patent Application No. 201811510768.8, filed on Dec. 11, 2018. The disclosures of the aforementioned applications are hereby incorporated by reference in their entireties.

TECHNICAL FIELD

Embodiments of this application relate to the field of electronic technologies, and in particular, to a transformer and a power supply.

BACKGROUND

Currently, with development of communications devices, a more advanced communications device has a smaller size accompanied with capacity expansion, and there is an increasing strong requirement for increasing a power density of a power supply unit (referred to as a power supply) that supplies power to the communications device. With continuous capacity expansion of the communications device, the communications device is continuously reduced in size per unit capacity. However, the power supply unit on a board of the communications device has smaller available space. Therefore, it is increasingly important to increase the power density of the power supply unit. Currently, the power density of the power supply unit increases from hundreds of watts/inch^3 to thousands of watts/inch^3.

The power supply unit mainly includes five parts: a primary-side switch circuit, a secondary-side rectifier circuit with an auxiliary heat dissipation component, a power magnetic element, a control and detection component, and an input filtering and protection component, as shown in FIG. 1. That the power magnetic element is designed to reduce an overall volume of the power magnetic element and increase the power density of the power supply unit is a main direction for breakthrough currently. To reduce the volume of the power magnetic element, a switching frequency continuously increases from tens of kHz to hundreds of kHz and then to MHz. As the frequency increases, a winding loss percentage has exceeded 50%. Currently, reducing a quantity of winding turns is an effective way to reduce a winding loss.

Currently, a solution to reducing the winding loss by using a fractional turn has been proposed in the industry. FIG. 2 and FIG. 3 are respectively a view of a transformer in a top view of a central magnetic cylinder and a side view of a magnetic core of the transformer. A primary-side winding La and secondary-side windings Lb1 to Lb4 are wound around the central magnetic cylinder. As shown in FIG. 3, two ends of a magnetic cylinder 1 and two ends of the central magnetic cylinder are coupled by using a first magnetic cover on an upper side and a second magnetic cover on a lower side, to form a magnetic flux loop on the left side; and two ends of a magnetic cylinder 2 and the two ends of the central magnetic cylinder are coupled by using the first magnetic cover on the upper side and the second magnetic cover on the lower side, to form a magnetic flux loop on the right side. The secondary-side winding and the primary-side winding are wound around the central magnetic cylinder. A winding width of a primary-side winding is restricted by a magnetic core window (referring to FIG. 3, the magnetic core window refers to space inside an annulus constituted by coupling the central magnetic cylinder to the magnetic cylinder 1, FIG. 3 only schematically marks a magnetic core window on a left side, and space inside an annulus constituted by coupling the central magnetic cylinder to the magnetic cylinder 2 is also referred to as a magnetic core window), and therefore utilization of the magnetic core window is low. The primary-side winding and the secondary-side winding crossly lead out. A terminal (for example, referring to FIG. 2, wiring from node a on primary-side winding La to a primary-side switch circuit and wiring from node b on primary-side winding La to the primary-side switch circuit) of the primary-side winding is long, and consequently a high-frequency effect of the terminal is great and losses are large. In addition, a safety spacing is difficult to set in a scenario in which safety isolation and insulation is required. When power needs to be increased, only a quantity of winding turns can be increased, resulting in an increase in a height of a power magnetic element. This is unfavorable to a winding flat design of the power magnetic element. In another solution, referring to a view of a transformer in a top view of a central magnetic cylinder provided in FIG. 4, a primary-side winding La is wound around the central magnetic cylinder, secondary-side windings Lb1 and Lb2 are wound around a magnetic cylinder 1, and secondary-side windings Lb3 and Lb4 are wound around a magnetic cylinder 2. A side view of a magnetic core is the same as that in FIG. 3. A primary-side winding and a secondary-side winding are wound on different magnetic cylinders, resulting in poor coupling and large leakage inductance. The primary-side winding and the secondary-side winding are not fully overlapped, and consequently a winding equivalent alternating current resistance (ACR) and a winding loss are large. Fluxes of the magnetic cylinders on both sides are unbalanced in consideration of voltage magnetic division.

In conclusion, in the currently provided solution, a magnetic cylinder distribution structure of a magnetic core is unreasonable, causing problems.

SUMMARY

Embodiments of this application provide a transformer and a power supply, and to provide a magnetic cylinder distribution structure of a convenient-to-implement magnetic core while reducing a winding loss by using a fractional turn, where the magnetic cylinder distribution structure of the magnetic core is conveniently to implement, thereby reducing product costs.

To achieve the foregoing objective, the following technical solutions are used in the embodiments of this application.

According to a first aspect, a transformer is provided, including a magnetic core, where the magnetic core includes a first magnetic cylinder and a second magnetic cylinder. One end of the first magnetic cylinder is coupled to one end of the second magnetic cylinder and the other end of the first magnetic cylinder is coupled to the other end of the second magnetic cylinder, to form an annulus. One or more primary-side windings are wound around the first magnetic cylinder and the second magnetic cylinder, and the primary-side winding is connected to a primary-side switch circuit. When the primary-side switch circuit supplies power to the primary-side winding, a magnetic flux is generated around the primary-side winding on the first magnetic cylinder and the second magnetic cylinder primary-side winding. A direction of a magnetic flux generated on the first magnetic cylinder is the same as a direction of a magnetic flux generated on the second magnetic cylinder. A secondary-side winding is separately wound around the first magnetic cylinder and the second magnetic cylinder, the secondary-side winding is configured to induce the magnetic flux on the first magnetic cylinder or the second magnetic cylinder to generate a current, and there are fractional turns of the secondary-side winding. In this way, when a winding loss is reduced by using a fractional turn, because both the primary-side winding and the secondary-side winding can be wound around the first magnetic cylinder and both the primary-side winding and the secondary-side winding can be wound around the second magnetic cylinder, the primary-side winding can directly generate the magnetic flux by using an annular structure constituted by coupling the first magnetic cylinder to the second magnetic cylinder, so that the secondary-side winding generates an induced current. In comparison with the prior art, this structure provides a simpler magnetic cylinder distribution structure of a magnetic core. In addition, the primary-side winding may be wound around the first magnetic cylinder or the second magnetic cylinder starting from any position. In comparison with the prior art, a terminal that is excessively long can be avoided, providing good winding distribution and a wire inlet and outlet channel. In addition, the secondary-side winding is wound around the magnetic cylinder. In comparison with the prior art in which the secondary-side winding is wound around only the central magnetic cylinder or magnetic cylinders on both sides, this increases utilization of a magnetic core window. In addition, because both the primary-side winding and the secondary-side winding can be wound around the first magnetic cylinder, and both the primary-side winding and the secondary-side winding can be wound around the second magnetic cylinder, problems of poor coupling and insufficient overlapping, resulting from that the primary-side winding and the secondary-side winding are wound around different magnetic cylinders. In addition, a problem that magnetic flux is unbalanced resulting from that the secondary-side winding is separately wound around the central magnetic cylinder and the magnetic cylinders on both sides is avoided.

Optionally, in an example solution, the secondary-side winding is connected to a secondary-side rectifier circuit, where the secondary-side rectifier circuit includes a first switch, a second switch, a third switch, a fourth switch, a fifth switch, a sixth switch, a seventh switch, an eighth switch, and four capacitor groups. Each capacitor group includes at least one capacitor or at least two capacitors connected in parallel. A first secondary-side winding, a second secondary-side winding, a third secondary-side winding, and a fourth secondary-side winding are wound around the first magnetic cylinder. One end of the first secondary-side winding is connected to a positive pole of a second capacitor group, and the other end of the first secondary-side winding is connected to a negative pole of a first capacitor group by using the first switch; and one end of the second secondary-side winding is connected to the positive pole of the second capacitor group, and the other end of the second secondary-side winding is connected to the negative pole of the first capacitor group by using the second switch, where the first secondary-side winding and the second secondary-side winding are wound around the first magnetic cylinder, and the first secondary-side winding and the second secondary-side winding are symmetric on a central line of a cross section that is perpendicular to the direction of the magnetic flux on the first magnetic cylinder. One end of the third secondary-side winding is connected to a positive pole of the first capacitor group, and the other end of the third secondary-side winding is connected to a negative pole of the second capacitor group by using the third switch; and one end of the fourth secondary-side winding is connected to the positive pole of the first capacitor group, and the other end of the fourth secondary-side winding is connected to the negative pole of the second capacitor group by using the fourth switch, where the third secondary-side winding and the fourth secondary-side winding are wound around the first magnetic cylinder, and the third secondary-side winding and the fourth secondary-side winding are symmetric on the central line of the cross section that is perpendicular to the direction of the magnetic flux on the first magnetic cylinder. A fifth secondary-side winding, a sixth secondary-side winding, a seventh secondary-side winding, and an eighth secondary-side winding are wound around the second magnetic cylinder. One end of the fifth secondary-side winding is connected to a positive pole of a fourth capacitor group, and the other end of the fifth secondary-side winding is connected to a negative pole of a third capacitor group by using the fifth switch; and one end of the sixth secondary-side winding is connected to the positive pole of the fourth capacitor group, and the other end of the sixth secondary-side winding is connected to the negative pole of the third capacitor group by using the sixth switch, where the fifth secondary-side winding and the sixth secondary-side winding are wound around the second magnetic cylinder, and the fifth secondary-side winding and the sixth secondary-side winding are symmetric on a central line of a cross section that is perpendicular to the direction of the magnetic flux on the second magnetic cylinder. One end of the seventh secondary-side winding is connected to a positive pole of the third capacitor group, and the other end of the seventh secondary-side winding is connected to a negative pole of the fourth capacitor group by using the seventh switch; and one end of the eighth secondary-side winding is connected to the positive pole of the third capacitor group, and the other end of the eighth secondary-side winding is connected to the negative pole of the fourth capacitor group by using the eighth switch, where the seventh secondary-side winding and the eighth secondary-side winding are wound around the second magnetic cylinder, and the seventh secondary-side winding and the eighth secondary-side winding are symmetric on the central line of the cross section that is perpendicular to the direction of the magnetic flux on the second magnetic cylinder. The foregoing switches may be switching transistors, such as field effect transistors.

Optionally, when a direction in which the primary-side switch circuit supplies power to the primary-side winding is a first direction, the first switch, the third switch, the sixth switch, and the eighth switch are turned on. When the direction in which the primary-side switch circuit supplies power to the primary-side winding is a second direction, the second switch, the fourth switch, the fifth switch, and the seventh switch are turned on. The first direction is opposite to the second direction. For example, when the primary-side switch circuit outputs an alternating current to the primary-side winding, the first direction is used for a direction of supplying power to the primary-side winding in one half cycle, and the second direction is used for a direction of supplying power to the primary-side winding in the other half cycle.

Optionally, a first primary-side winding and a second primary-side winding are wound around the first magnetic cylinder, and the first primary-side winding and the second primary-side winding are wound around the second magnetic cylinder. When a first primary-side switch circuit of the first primary-side winding supplies power to the first primary-side winding, and a second primary-side switch circuit of the second primary-side winding supplies power to the second primary-side winding, a direction of a magnetic flux generated by the first primary-side winding on the first magnetic cylinder and by the second primary-side winding on the second magnetic cylinder is the same as a direction of a magnetic flux generated by the second primary-side winding on the first magnetic cylinder and the first primary-side winding on the second magnetic cylinder. For example, for the annulus structure constituted by coupling the first magnetic cylinder to the second magnetic cylinder, when the direction of the magnetic flux is a counterclockwise direction, the direction of the magnetic flux on the first magnetic cylinder is perpendicular to paper inward, and the direction of the magnetic flux on the second magnetic cylinder is perpendicular to paper outward. For the annulus structure constituted by coupling the first magnetic cylinder to the second magnetic cylinder, when the direction of the magnetic flux is a clockwise direction, the direction of the magnetic flux on the first magnetic cylinder is perpendicular to paper outward, and the direction of the magnetic flux on the second magnetic cylinder is perpendicular to paper inward.

In addition, for thermal balance on a board, for two primary-side windings: the first primary-side winding and the second primary-side winding, the primary-side switch circuit of the first primary-side winding and the primary-side switch circuit of the second primary-side winding may be respectively disposed on two sides of the magnetic core. For example, the first primary-side switch circuit is located on a side that is of the first magnetic cylinder and that is away from the second magnetic cylinder, and the second primary-side switch circuit is located on a side that is of the second magnetic cylinder and that is away from the first magnetic cylinder.

Optionally, the primary-side winding is separately wound one turn around the first magnetic cylinder and the second magnetic cylinder.

Optionally, the primary-side winding is a PCB winding or a metal conducting-wire winding. In addition, to increase a current flow, the primary-side winding may be a structure constituted by a plurality of PCB layers connected in parallel.

Optionally, the secondary-side winding is a PCB winding or a metal conducting-wire winding. In addition, to increase a current flow, the secondary-side winding may be a structure constituted by a plurality of PCB layers connected in parallel.

Optionally, the first magnetic cylinder and the second magnetic cylinder may be disposed between a first magnetic core cover and a second magnetic core cover, to implement coupling the first magnetic cylinder to the second magnetic cylinder. For example, the magnetic core further includes the first magnetic core cover and the second magnetic core cover. The first magnetic cylinder and the second magnetic cylinder are disposed between the first magnetic core cover and the second magnetic core cover. One end of the first magnetic cylinder is connected to the first magnetic core cover, and the other end of the first magnetic cylinder is connected to the second magnetic core cover. One end of the second magnetic cylinder is connected to the first magnetic core cover, and the other end of the second magnetic cylinder is connected to the second magnetic core cover.

According to a second aspect, a power supply is provided, including the foregoing transformer, a primary-side switch circuit that is connected to a primary-side winding of the transformer, and a secondary-side rectifier circuit that is connected to a secondary-side winding of the transformer. For beneficial effects of the second aspect in this application, refer to analysis on beneficial effects of the first aspect and the various implementations of the first aspect. Details are not described herein again.

These aspects or other aspects in this application are more concise and comprehensible in the following descriptions.

BRIEF DESCRIPTION OF DRAWINGS

To describe the technical solutions in the embodiments of the present application or in the prior art more clearly, the following briefly describes the accompanying drawings required for describing the embodiments.

DESCRIPTION OF EMBODIMENTS

The following clearly describes the technical solutions in the embodiments of the present application with reference to the accompanying drawings in the embodiments of the present application.

In the descriptions of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of this application, "a plurality of" means two or more unless otherwise specified. A left side, a right side, an upper side, a lower side, a clockwise direction, a counterclockwise direction, being perpendicular to paper inward, being perpendicular to paper outward, and the like in this application are all described by using examples in the accompanying drawings as examples. In some cases, for example, when an accompanying drawing is rotated by 180 degrees for viewing, the left side may be switched to the right side; or when an accompanying drawing provided in the embodiments of this application is viewed in an opposite direction, the clockwise direction may be switched to the counterclockwise direction. Therefore, the foregoing directional descriptions are defined with reference to the accompanying drawings in the embodiments of this application for a person skilled in the art to clearly understand the solutions, and the foregoing directional descriptions do not constitute any limitation on the embodiments of this application.

Currently, with development of communications devices, a more advanced communications device has a smaller size accompanied with capacity expansion, and there is an increasing strong requirement for increasing a power density of a power supply unit (referred to as a power supply) that supplies power to the communications device. With continuous capacity expansion of the communications device, the communications device is continuously reduced in size per unit capacity. However, the power supply unit on a board of the communications device has smaller available space. Therefore, it is increasingly important to increase the power density of the power supply unit. Currently, the power density of the power supply unit increases from hundreds of watts/inch^3 to thousands of watts/inch^3.

Figure 1:
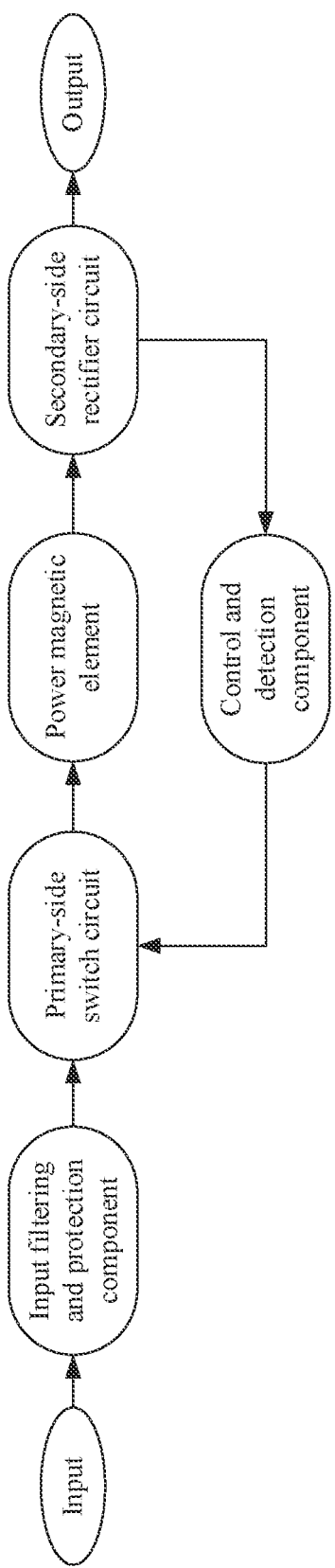
FIG. 1 is a schematic structural diagram of a power supply unit according to an embodiment of this application.

As shown in FIG. 1, a power supply unit mainly includes a primary-side switch circuit, a secondary-side rectifier circuit with an auxiliary heat dissipation component (not shown in FIG. 1), a power magnetic element, a control and detection component, and an input filtering and protection component. The input filtering and protection component is a passive component. The input filtering and protection component is mostly in a standard configuration, and therefore it is less probably to reduce a volume and it is costly. The control and detection component is a resistance-capacitance component, and is not a bottleneck for increasing a power density. Sizes and heat dissipation capabilities of the primary-side switch circuit and the secondary-side rectifier circuit depend on development of basic semiconductor technologies and material technologies, and depend on whether to match a pace of an evolution of a product power density. The power magnetic element accounts for approximately 30% of a total volume of the entire power supply unit. That the power magnetic element is designed to reduce an overall volume of the power magnetic element and increase the power density of the power supply unit is a main direction for breakthrough currently. A power magnetic element is usually referred to as a transformer. To reduce the volume of the power magnetic element, a switching frequency continuously increases from tens of kHz to hundreds of kHz and then to MHz. As the frequency increases, a winding loss percentage has exceeded 50%. How to reduce a winding loss becomes a difficult problem. Reducing a quantity of turns of a secondary-side winding (or referred to as a secondary-side winding) is an effective way to reduce the winding loss. However, when the quantity of the turns is reduced to 1, it is difficult to further reduce the quantity of the turns from a perspective of a turn ratio design. Due to impact of a skin effect and a proximity effect of a conductor as the frequency is high, it is ineffective to increase an area of the conductor, and it is costly. Therefore, how to make a breakthrough in reducing a quantity of turns to less than 1 has become a research direction in the industry. In recent years, a fractional turn mechanism has been described in detail in related documentation published by many research institutions and scholars. Broadly speaking, the fractional turn is a relative concept to an integral turn. However, a prior-art fractional turn has low engineering feasibility, and is costly in implementation, resulting in restrictions in commercial application. The integral turn means that a quantity of turns of a secondary-side winding is positive integer, and the fractional turn means that a quantity of turns of a secondary-side winding is a positive fraction. In this application, as it is reached how to make a breakthrough in reducing the quantity of turns of a secondary-side winding to less than 1 winding, in the following solution, a fractional turn means that the quantity of the turns of the secondary-side winding is less than 1, that is, the quantity of the turns of the secondary-side winding is greater than 0 and less than 1. In addition, in the embodiments of this application, a primary-side winding is a winding that generates a magnetic flux in a magnetic core after the winding being powered on, and the secondary-side winding is a winding that generates an induced current by inducting the magnetic flux in the magnetic core. In some embodiments, a primary side may also be a primary side, and a secondary side may also be a secondary side.

Although the solution to reducing a winding loss by using a fractional turn has been proposed in the industry, in a currently provided solution, a magnetic cylinder distribution structure of a magnetic core is unreasonable, still causing problems.

Figure 2:
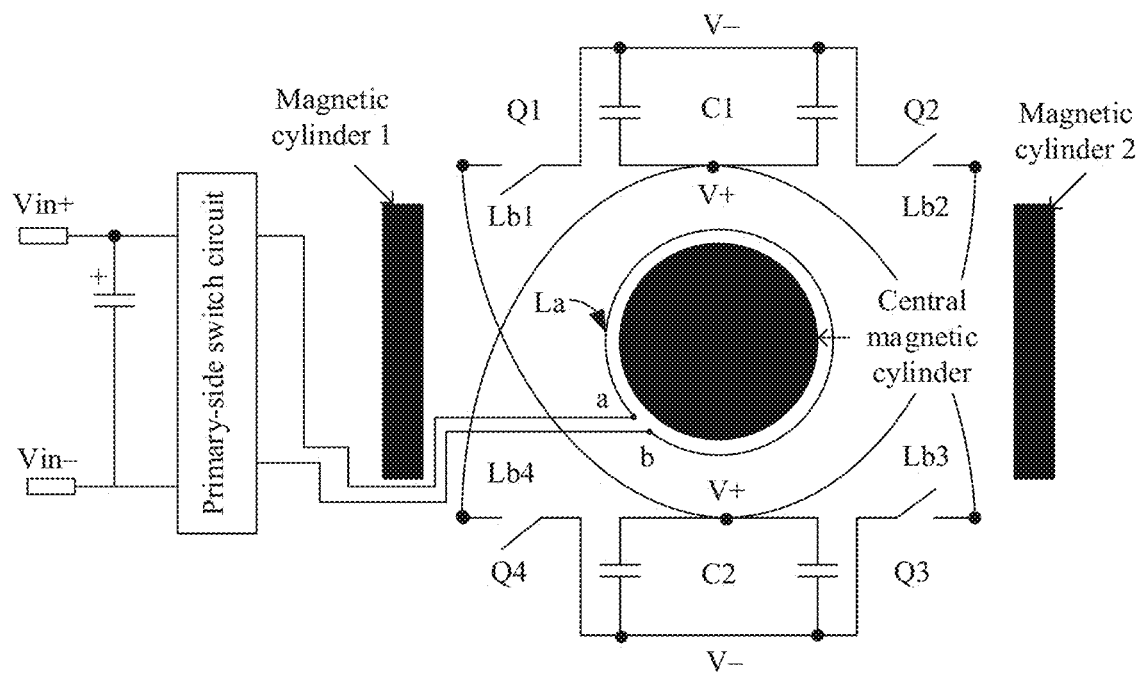
FIG. 2 is a view of a transformer in a top view of a central magnetic cylinder in the prior art.
Figure 3:
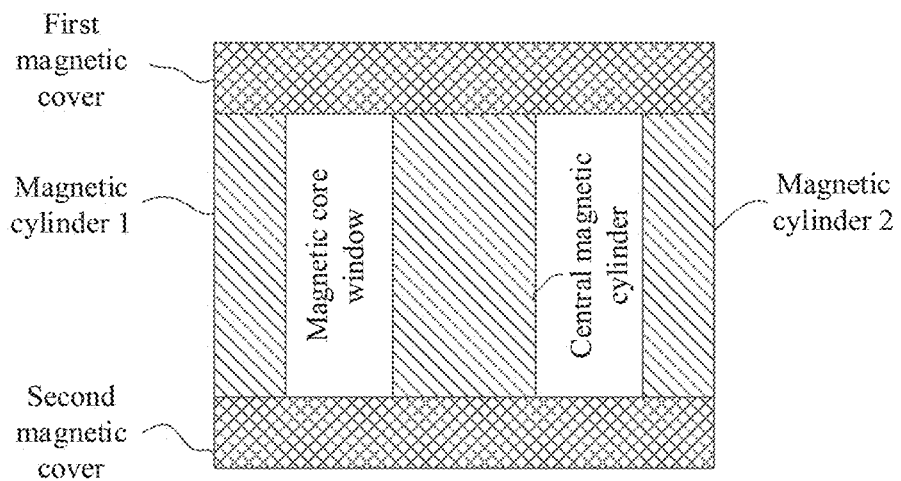
FIG. 3 is a side view of a magnetic core of the transformer shown in FIG. 2 in the prior art.
Figure 4:
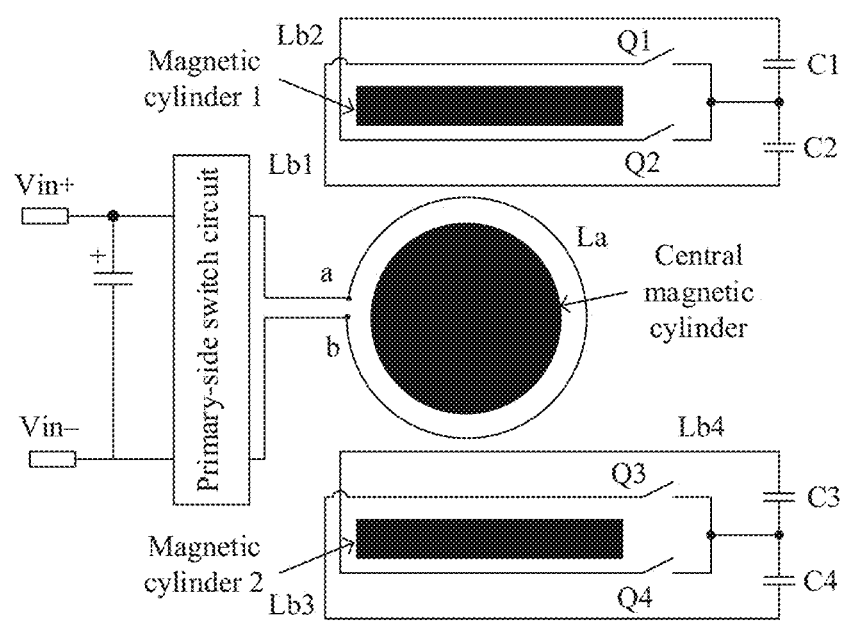
FIG. 4 is a view of another transformer in a top view of a central magnetic cylinder in the prior art.

For example, in a solution, with reference to a view of a transformer in a top view of a central magnetic cylinder provided in FIG. 2 and a side view of a magnetic core of the transformer provided in FIG. 3. A primary-side winding La and secondary-side windings Lb1 to Lb4 are wound around the central magnetic cylinder. As shown in FIG. 3, two ends of a magnetic cylinder 1 and two ends of the central magnetic cylinder are coupled by using a first magnetic cover on an upper side and a second magnetic cover on a lower side, to form a magnetic flux loop on a left side; and two ends of a magnetic cylinder 2 and the two ends of the central magnetic cylinder are coupled by using the first magnetic cover on the upper side and the second magnetic cover on the lower side, to form a magnetic flux loop on the right side. The primary-side winding La and a primary-side switch circuit that is connected to the primary-side winding La form a power loop at a primary side. Secondary-side switches (for example, switching transistors) Q1 and Q3, the secondary-side winding Lb1 connected to Q1, the secondary-side winding Lb3 connected to Q3, and capacitor groups C1 and C2 (the capacitor group may include a series-parallel connection structure of one or more capacitors) form a half-cycle power loop at a first secondary side. Secondary-side switches (for example, switching transistors) Q2 and Q4, the secondary-side winding Lb2 connected to Q2, the secondary-side winding Lb4 connected to Q4, and the capacitor groups C1 and C2 form a half-cycle power loop at a second secondary side. When the primary-side switch circuit outputs an alternating current to the primary-side winding, the primary-side switch circuit inputs a current of a first direction (for example, a current direction on La is from a to b) to the primary-side winding La within one half cycle, so that a magnetic flux perpendicular to paper inward is generated in the central magnetic cylinder. In this half cycle, Q1 and Q3 are turned on, so that the half-cycle power loop at the first secondary-side is in a working state. The primary-side switch circuit inputs a current of a second direction to the primary-side winding La (for example, a current direction on La is from b to a) within the other half cycle, so that a magnetic flux perpendicular to paper outward is generated in the central magnetic cylinder. In this half cycle, Q2 and Q4 are turned on, so that the half-cycle power loop at the second secondary side is in a working state. In this way, the two power loops at the secondary side (the half-cycle power loop at the first secondary side and the half-cycle power loop at the second secondary side) work alternately with a current of the power loop at the primary side. The secondary-side winding and the primary-side winding are wound around the central magnetic cylinder. A winding width is restricted by a magnetic core window (referring to FIG. 3, the magnetic core window refers to space inside an annulus constituted by coupling the central magnetic cylinder to the magnetic cylinder 1, FIG. 3 only schematically marks the magnetic core window on the left side, and space inside an annulus constituted by coupling the central magnetic cylinder to the magnetic cylinder 2 is also referred to as the magnetic core window), and therefore utilization of the magnetic core window is low. The primary-side winding and the secondary-side winding crossly lead out. Affected by a layout of the magnetic cylinder 1 on the left side, a terminal (for example, referring to FIG. 2, wiring from node a on La to the primary-side switch circuit and wiring from node b on La to the primary-side switch circuit) of the primary-side winding is long, and consequently a high-frequency effect of the terminal is great and losses are large. In addition, a safety spacing is difficult to set in a scenario in which safety isolation and insulation is required. When power needs to be increased, only a quantity of winding turns can be increased, resulting in an increase in a height of a power magnetic element. This is unfavorable to a flat design of the power magnetic element. In addition, if a printed circuit board (printed circuit board, PCB) is used as a winding, costs are increased. In another solution, with reference to a view of a transformer in a top view of a central magnetic cylinder provided in FIG. 4, a primary-side winding La is wound around the central magnetic cylinder, a secondary-side winding Lb1 and a secondary-side winding Lb2 are wound around a magnetic cylinder 1, and a secondary-side winding Lb3 and a secondary-side winding Lb4 are wound around a magnetic cylinder 2. A side view of a magnetic core of the transformer is the same as the magnetic core in FIG. 3. That is, in this solution, two ends of the magnetic cylinder 1 and two ends of the central magnetic cylinder are coupled by using a first magnetic cover on an upper side and a second magnetic cover on a lower side, to form a magnetic flux loop on a left side; and two ends of the magnetic cylinder 2 and the two ends of the central magnetic cylinder are coupled by using the first magnetic cover on the upper side and the second magnetic cover on the lower side, to form a magnetic flux loop on the right side, where the central magnetic cylinder is separately coupled with the magnetic cylinder 1 and the magnetic cylinder 2. A magnetic flux generated by the secondary-side winding being coupled to a ½ primary-side winding implements an effect of a ½ turn of the secondary-side winding by means of voltage magnetic division. The primary-side winding La and a primary-side switch circuit form a power loop at a primary side. A power loop constituted by a secondary-side switch (for example, a switching transistor) Q1, the secondary-side winding Lb1 connected to Q1, and C2, and a power loop constituted by Q3, the secondary-side winding Lb3 connected to Q3, and C4 form a half-cycle power loop at a first secondary side. A power loop constituted by a secondary-side switch (for example, a switching transistor) Q2, the secondary-side winding Lb2 connected to Q2, and C1, and a power loop constituted by Q4, the secondary-side winding Lb4 connected to Q4, and C3 form a half-cycle power loop at a second secondary side. The primary-side switch circuit inputs a current of a first direction (for example, a current direction on La is from a to b) to the primary-side winding La within one half cycle, so that a magnetic flux perpendicular to paper inward is generated in the central magnetic cylinder. In this half cycle, Q1 and Q3 are turned on, so that the half-cycle power loop at the first secondary side is in a working state. The primary-side switch circuit inputs a current of a second direction (for example, a current direction on La is from b to a) to the primary-side winding La within the other half cycle, so that a magnetic flux (a magnetic flux) perpendicular to paper outward is generated in the central magnetic cylinder. In this half cycle, Q2 and Q4 are turned on, so that the half-cycle power loop at the second secondary side is in a working state. The two power loops at the secondary side (the half-cycle power loop at the first secondary side and the half-cycle power loop at the second secondary side) work alternately with a current of the power loop at the primary side. However, the primary-side winding and the secondary-side winding are wound on different magnetic cylinders, resulting in poor coupling and large leakage inductance. The primary-side winding and a secondary-side winding are not fully overlapped, and consequently a winding equivalent alternating current resistance (ACR) and a winding loss are large. Fluxes of the magnetic cylinders on both sides are unbalanced in consideration of the voltage magnetic division.

Figure 5:
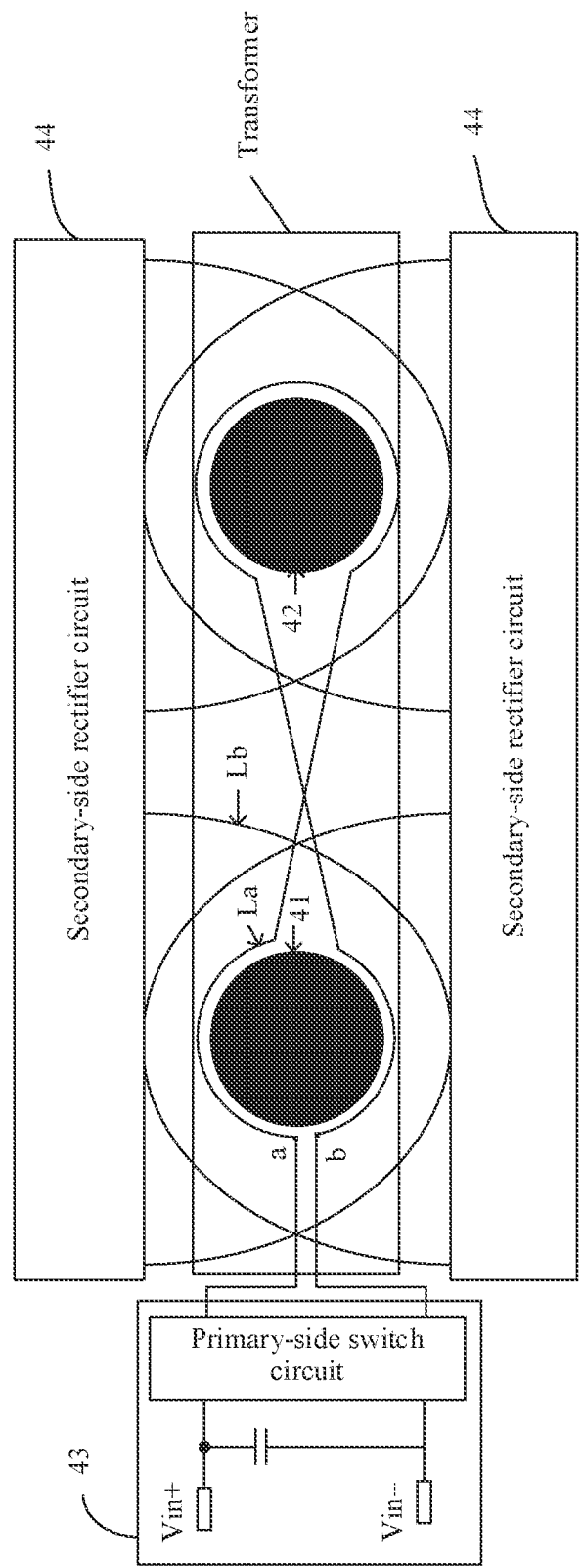
FIG. 5 is a view of a transformer in a top view of a magnetic core according to an embodiment of this application.
Figure 6:
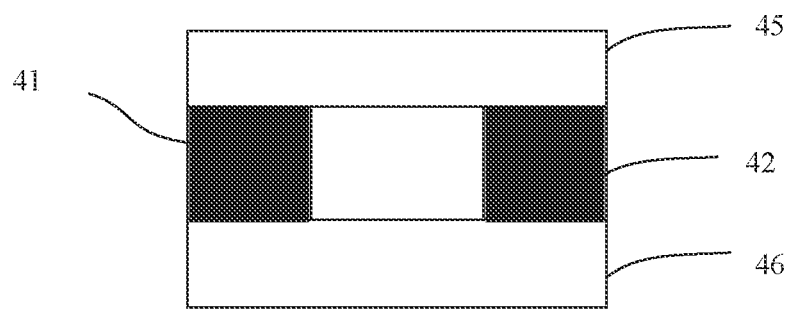
FIG. 6 is a structural side view 1 of a magnetic core of the transformer shown in FIG. 5 according to an embodiment of this application.

With reference to the foregoing problem, an embodiment of this application provides a transformer, so as to reduce the winding loss by using a fractional turn, and to provide a structure that is more convenient to implement, thereby reducing product costs. Specifically, FIG. 5 provides a view of a transformer in a top view of a magnetic core, and FIG. 6 provides a structural side view of a magnetic core of the transformer. The transformer includes a magnetic core, a primary-side winding La, and secondary-side windings Lb1 to Lb8. The magnetic core includes a first magnetic cylinder 41 and a second magnetic cylinder 42. One end of the first magnetic cylinder 41 is coupled to one end of the second magnetic cylinder 42, and the other end of the first magnetic cylinder 41 is coupled to the other end of the second magnetic cylinder 42, to form an annulus. At least one or more primary-side windings La are wound around the first magnetic cylinder 41 and the second magnetic cylinder 42, where the primary-side winding is connected to a primary-side switch circuit 43. When the primary-side switch circuit 43 supplies power to the primary-side winding La, a magnetic flux is generated around the primary-side winding La on the first magnetic cylinder 41 and the second magnetic cylinder 42. A direction of a magnetic flux generated on the first magnetic cylinder 41 is the same as a direction of a magnetic flux generated on the second magnetic cylinder 42. A secondary-side windings Lb is separately wound around the first magnetic cylinder 41 and the second magnetic cylinder 42, the secondary-side winding Lb is configured to induce the magnetic flux on the first magnetic cylinder 41 or the magnetic flux on the second magnetic cylinder 42 to generate a current, and there are fractional turns of the secondary-side winding Lb.

Figure 7:
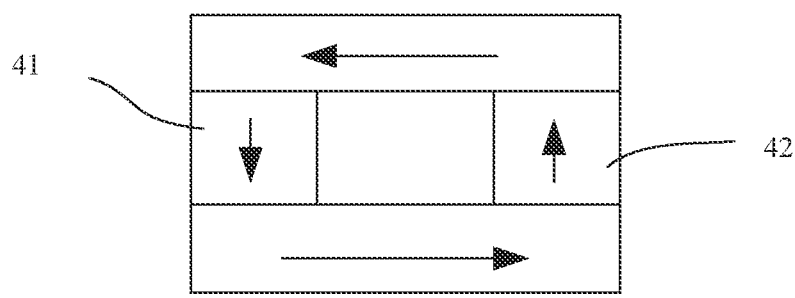
FIG. 7 is a structural side view 2 of a magnetic core of the transformer shown in FIG. 5 according to an embodiment of this application.
Figure 8:
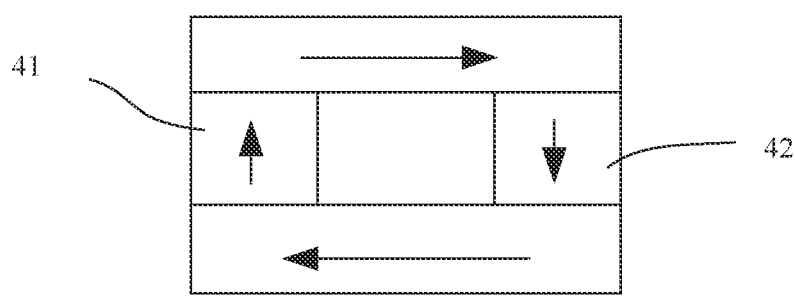
FIG. 8 is a structural side view 3 of a magnetic core of the transformer shown in FIG. 5 according to an embodiment of this application.

It should be noted that there are fractional turns of the secondary-side winding Lb. For example, the quantity of the turns of the secondary-side winding is greater than 0 and less than 1, specifically, 0.5 turn. When the primary-side switch circuit 43 supplies power to the primary-side winding La, the direction of the magnetic flux generated on the first magnetic cylinder 41 and the direction of the magnetic flux generated on the second magnetic cylinder 42 are the same. The direction of the magnetic flux is also referred to as a magnetic path. Certainly, there may be another definition manner in the technical field. For example, FIG. 7 is a structural side view of a magnetic core of the transformer. According to an annular structure constituted by coupling the first magnetic cylinder 41 and the second magnetic cylinder 42, the direction of the magnetic flux is a counter-clockwise direction. In this case, in the transformer shown in FIG. 5, the direction of the magnetic flux of the first magnetic cylinder 41 is perpendicular to paper inward, and the direction of the magnetic flux of the second magnetic cylinder 42 is perpendicular to paper outward. Referring to FIG. 8, FIG. 8 is a structural side view of a magnetic core of the transformer. According to an annular structure constituted by coupling the first magnetic cylinder 41 and the second magnetic cylinder 42, the direction of the magnetic flux is a clockwise direction. In this case, in the transformer shown in FIG. 5, the direction of the magnetic flux of the first magnetic cylinder 41 is perpendicular to paper outward, and the direction of the magnetic flux of the second magnetic cylinder 42 is perpendicular to paper inward. Therefore, the primary-side winding is separately wound around two magnetic cylinders in opposite directions. That is, as shown in FIG. 5, the primary-side winding La is wound around the first magnetic cylinder in the clockwise direction, and the primary-side winding La is wound around the second magnetic cylinder in the counterclockwise direction. The primary-side winding forms one turn of winding on the first magnetic cylinder 41 and the primary-side winding forms one turn of winding on the second magnetic cylinder 42. When the primary-side windings are powered on, two turns of windings separately form a same direction of a magnetic flux generated on the magnetic cylinders that the two turns of the windings are wound around. FIG. 5 further shows input voltages (Vin+ and Vin−) of the primary-side switch circuit 43.

In addition, as shown in FIG. 6, to implement coupling the first magnetic cylinder 41 to the second magnetic cylinder 42, the magnetic core further includes a first magnetic core cover 45 and a second magnetic core cover 46. The first magnetic cylinder 41 and the second magnetic cylinder 42 are disposed between the first magnetic core cover 45 and the second magnetic core cover 46. One end of the first magnetic cylinder 41 is connected to the first magnetic core cover 45, and the other end of the first magnetic cylinder 41 is connected to the second magnetic core cover 46. One end of the second magnetic cylinder 42 is connected to the first magnetic core cover 45, and the other end of the second magnetic cylinder 42 is connected to the second magnetic core cover 46.

In this way, when a winding loss is reduced by using a fractional turn, because both the primary-side winding and the secondary-side winding can be wound around the first magnetic cylinder and both the primary-side winding and the secondary-side winding can be wound around the second magnetic cylinder, the primary-side winding can directly generate the magnetic flux by using an annular structure constituted by coupling the first magnetic cylinder to the second magnetic cylinder, so that the secondary-side winding generates an induced current. In comparison with the prior art, this structure provides a simpler magnetic cylinder distribution structure of a magnetic core. In addition, the primary-side winding may be wound around the first magnetic cylinder or the second magnetic cylinder starting from any position. In comparison with the prior art, it can be avoided that a terminal is excessively long, providing good winding distribution and a wire inlet and outlet channel. In addition, the secondary-side winding is wound around the magnetic cylinder. In comparison with the prior art in which the secondary-side winding is wound around only the central magnetic cylinder or the magnetic cylinders on both sides, this increases utilization of a magnetic core window. In addition, because both the primary-side winding and the secondary-side winding can be wound around the first magnetic cylinder, and both the primary-side winding and the secondary-side winding can be wound around the second magnetic cylinder, problems of poor coupling and insufficient overlapping, resulting from that the primary-side winding and the secondary-side winding are wound around different magnetic cylinders. In addition, a problem that magnetic flux is unbalanced resulting from that the secondary-side winding is separately wound around the central magnetic cylinder and the magnetic cylinders on both sides is avoided.

Figure 9:
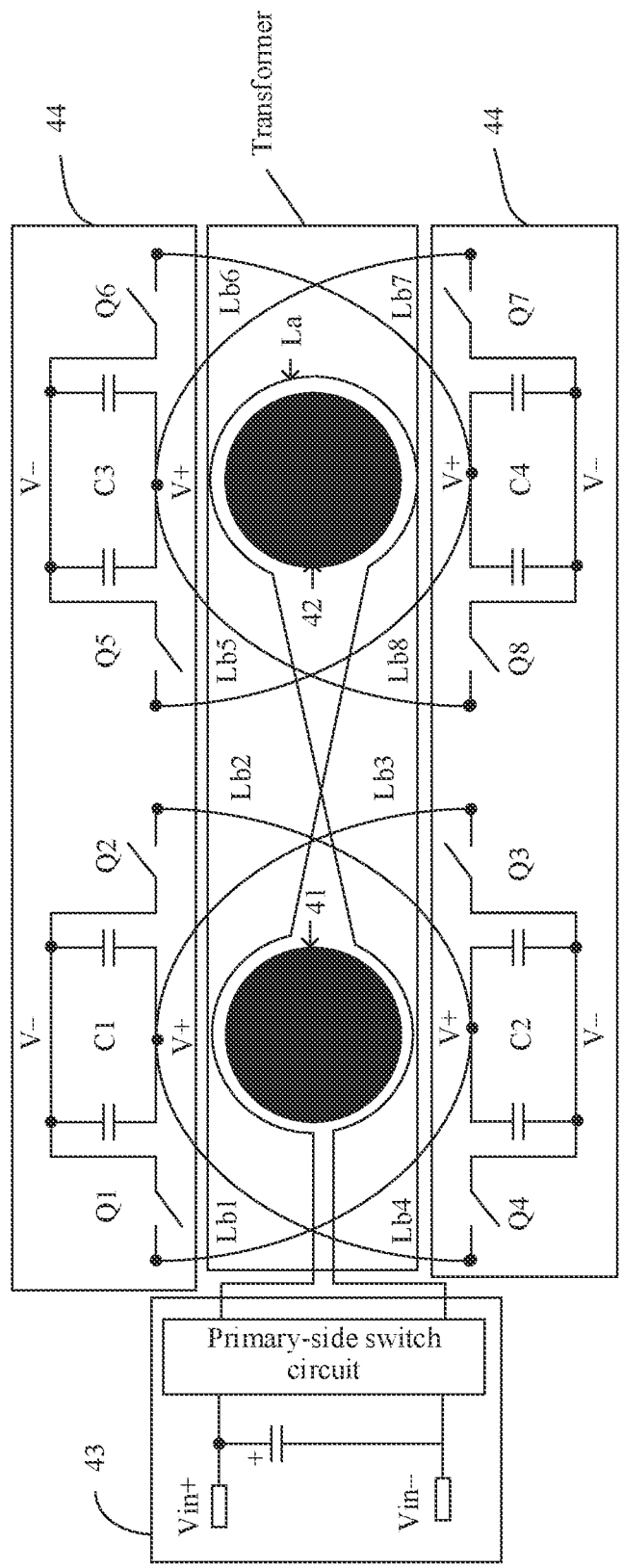
FIG. 9 is a view of a transformer in a top view of a magnetic core according to another embodiment of this application.

FIG. 9 is a view of a transformer in a top view of a magnetic core, where a secondary-side winding is connected to a secondary-side rectifier circuit 44. The secondary-side rectifier circuit 44 includes eight switches, where the eight switches may be switching transistors, including a first switch Q1, a second switch Q2, a third switch Q3, a fourth switch Q4, a fifth switch Q5, a sixth switch Q6, a seventh switch Q7, an eighth switch Q8, and four capacitor groups (C1-C4). Each capacitor group includes at least one capacitor or at least two capacitors connected in parallel. The foregoing switches may be the switching transistors, such as field effect transistors.

A first secondary-side winding Lb1, a second secondary-side winding Lb2, a third secondary-side winding Lb3, and a fourth secondary-side winding Lb4 are wound around a first magnetic cylinder 41. One end of the first secondary-side winding Lb1 is connected to a positive pole of a second capacitor group C2, and the other end of the first secondary-side winding Lb1 is connected to a negative pole of a first capacitor group C1 by using the first switch Q1; and one end of the second secondary-side winding Lb2 is connected to the positive pole of the second capacitor group C2, and the other end of the second secondary-side winding Lb2 is connected to the negative pole of the first capacitor group C1 by using the second switch Q2, where the first secondary-side winding Lb1 and the second secondary-side winding Lb2 are wound around the first magnetic cylinder 41, and the first secondary-side winding Lb1 and the second secondary-side winding Lb2 are symmetric on a central line of a cross section that is perpendicular to a direction of a magnetic flux on the first magnetic cylinder 41. One end of the third secondary-side winding Lb3 is connected to a positive pole of the first capacitor group C1, and the other end of the third secondary-side winding Lb3 is connected to a negative pole of the second capacitor group C2 by using the third switch Q3; and one end of the fourth secondary-side winding Lb4 is connected to the positive pole of the first capacitor group C1, and the other end of the fourth secondary-side winding Lb4 is connected to the negative pole of the second capacitor group C2 by using the fourth switch Q4, where the third secondary-side winding Lb3 and the fourth secondary-side winding Lb4 are wound around the first magnetic cylinder 41, and the third secondary-side winding Lb3 and the fourth secondary-side winding Lb4 are symmetric on the central line of the cross section that is perpendicular to the direction of the magnetic flux on the first magnetic cylinder 41. A fifth secondary-side winding Lb5, a sixth secondary-side winding Lb6, a seventh secondary-side winding Lb7, and an eighth secondary-side winding Lb8 are wound around a second magnetic cylinder 42. One end of the fifth secondary-side winding Lb5 is connected to a positive pole of a fourth capacitor group C4, and the other end of the fifth secondary-side winding Lb5 is connected to a negative pole of a third capacitor group C3 by using the fifth switch Q5; and one end of the sixth secondary-side winding Lb6 is connected to the positive pole of the fourth capacitor group C4, and the other end of the sixth secondary-side winding Lb6 is connected to the negative pole of the third capacitor group C3 by using the sixth switch Q6, where the fifth secondary-side winding Lb5 and the sixth secondary-side winding Lb6 are wound around the second magnetic cylinder 42, and the fifth secondary-side winding Lb5 and the sixth secondary-side winding Lb6 are symmetric on a central line of a cross section that is perpendicular to the direction of the magnetic flux on the second magnetic cylinder 42. One end of the seventh secondary-side winding Lb7 is connected to a positive pole of the third capacitor group C3, and the other end of the seventh secondary-side winding Lb7 is connected to a negative pole of the fourth capacitor group C4 by using the seventh switch Q7; and one end of the eighth secondary-side winding Lb8 is connected to the positive pole of the third capacitor group C3, and the other end of the eighth secondary-side winding Lb8 is connected to the negative pole of the fourth capacitor group C4 by using the eighth switch Q8, where the seventh secondary-side winding Lb7 and the eighth secondary-side winding Lb8 are wound around the second magnetic cylinder 42, and the seventh secondary-side winding Lb7 and the eighth secondary-side winding Lb8 are symmetric on the central line of the cross section that is perpendicular to the direction of the magnetic flux on the second magnetic cylinder 42.

As shown in FIG. 9, the transformer may include one primary-side winding La. The primary-side winding La is separately wound around two magnetic cylinders in opposite directions, to form one turn of winding on a first magnetic cylinder 41 and one turn of winding on a second magnetic cylinder 42. Two turns of windings separately form a same direction of the magnetic flux generated on the magnetic cylinders that the two turns of the windings are wound around. The primary-side winding La and a primary-side switch circuit 43 form a power loop at a primary side. Secondary-side switches Q1, Q3, Q6, and Q8, secondary-side windings Lb1, Lb3, Lb6, and Lb8 that are respectively connected to Q1, Q3, Q6, and Q8, and capacitor groups C1, C2, C3, and C4 that are respectively connected to Q1, Q3, Q6, and Q8 form a half-cycle power loop at a secondary side. Secondary-side switches Q2, Q4, Q5, and Q7, secondary-side windings Lb2, Lb4, Lb5, and Lb7 that are respectively connected to Q2, Q4, Q5, and Q7, and the capacitor groups C1, C2, C3, and C4 that are respectively connected to Q2, Q4, Q5, and Q7 form the other half-cycle power loop at the secondary side. The two half-cycle power loops at the secondary side work alternately with a current of the power loop at the primary side. The capacitor groups C1, C2, C3, and C4 are connected in parallel to output a load current.

Figure 10:
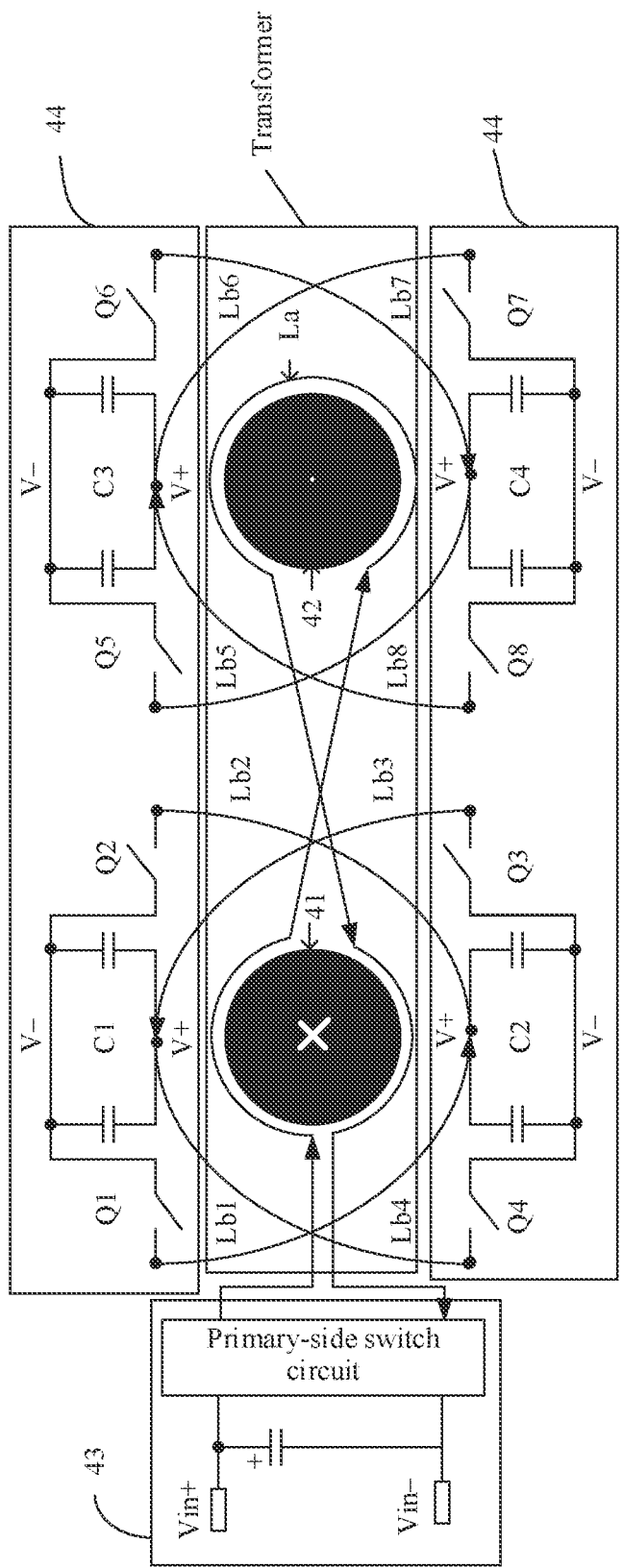
FIG. 10 is a schematic diagram of a working current of the transformer shown in FIG. 7 according to an embodiment of this application.
Figure 11:
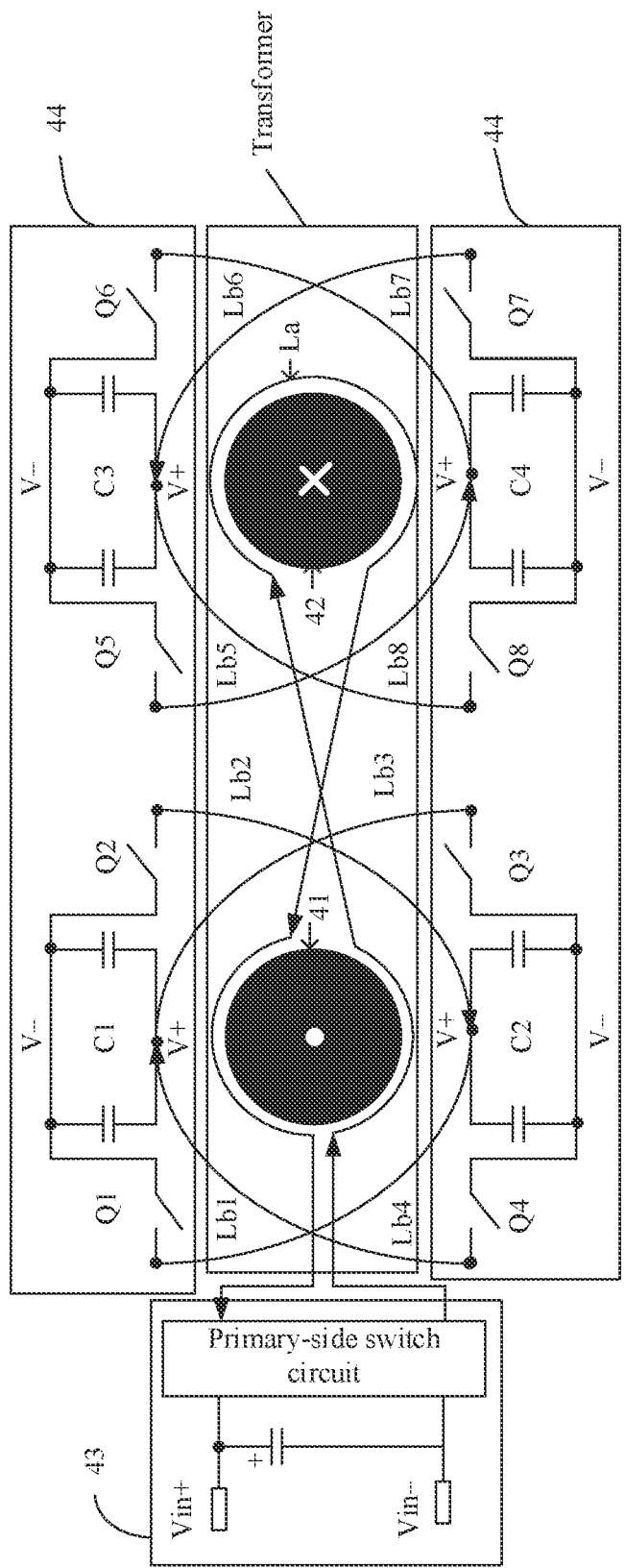
FIG. 11 is a schematic diagram of a working current of the transformer shown in FIG. 7 according to another embodiment of this application.

Referring to FIG. 10 and FIG. 11, working currents of the two half-cycle power loops of the transformer are described as follows. When a direction in which the primary-side switch circuit 43 supplies power to the primary-side winding La is a first direction (for example, as shown in FIG. 10, the first direction at a first magnetic cylinder is a clockwise direction, and the first direction at a second magnetic cylinder is a counterclockwise direction), Q1, Q3, Q6, and Q8 are turned on. A current of the primary-side winding La and a current of the second primary-side winding La2 flow around the first magnetic cylinder 41 on a left side in a clockwise direction, and flow around the second magnetic cylinder 42 on a right side in a counterclockwise direction, so that a direction of a magnetic flux generated on the first magnetic cylinder 41 is perpendicular to paper inward (for example, indicated by a dot at a center of the first magnetic cylinder 41 in FIG. 10), and a direction of a magnetic flux generated on the second magnetic cylinder 42 is perpendicular to paper outward (for example, indicated by a symbol x at a center of the second magnetic cylinder 42 in FIG. 10). Directions of magnetic fluxes in a loop constituted by coupling the two magnetic cylinders are the same. That is, as shown in FIG. 7, the directions of the magnetic fluxes on the two magnetic cylinders are both counterclockwise directions. The switches Q1, Q3, Q6, and Q8 are turned on, and Q2, Q4, Q5, and Q7 are turned off. In a power loop that is constituted by the switches Q1 and Q3, two secondary-side windings that are respectively connected to Q1 and Q3, and the capacitor groups C1 and C2, a current flows in a counterclockwise direction; and in a power loop that is constituted by the switches Q6 and Q8, two secondary-side windings that are respectively connected to Q6 and Q8, and the capacitor groups C3 and C4, a current flows in a clockwise direction.

When the direction in which the primary-side switch circuit 43 supplies power to the primary-side winding La is a second direction (for example, as shown in FIG. 11, the second direction at the first magnetic cylinder is a counterclockwise direction, and the second direction at the second magnetic cylinder is a clockwise direction), Q2, Q4, Q5, and Q7 are turned on. A current of the primary-side winding La and a current of the second primary-side winding La2 flow around the first magnetic cylinder 41 on a left side in a counterclockwise direction, and flow around the second magnetic cylinder 42 on a right side in a clockwise direction, so that a direction of a magnetic flux generated on the first magnetic cylinder 41 on the left side is perpendicular to paper outward (for example, indicated by a symbol at a center of the first magnetic cylinder 41 in FIG. 11), and a direction of a magnetic flux generated on the second magnetic cylinder 42 on the right side is perpendicular to paper inward (for example, indicated by a symbol x at a center of the second magnetic cylinder 42 in FIG. 11). Directions of magnetic fluxes in the loop constituted by coupling the two magnetic cylinders are the same. That is, as shown in FIG. 8, the directions of the magnetic fluxes on the two magnetic cylinders are both clockwise directions. The switches Q1, Q3, Q6, and Q8 are turned off, and Q2, Q4, Q5, and Q7 are turned on. In a power loop that is constituted by the switches Q2 and Q4, two secondary-side windings that are respectively connected to Q2 and Q4, and the capacitor groups C1 and C2, a current flows in a clockwise direction; and in a power loop that is constituted by the switches Q5 and Q7, two secondary-side windings that are respectively connected to Q5 and Q7, and the capacitor groups C3 and C4, a current flows in a counterclockwise direction.

Figure 12:
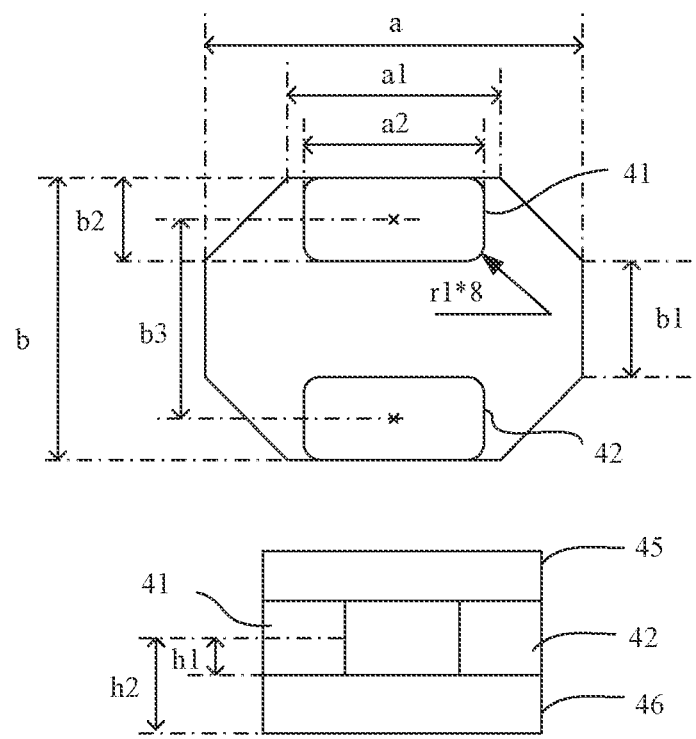
FIG. 12 is a schematic size diagram of a magnetic core of a transformer according to an embodiment of this application.

In this embodiment of this application, actual measured data of a transformer is provided. FIG. 12 a schematic size diagram of a magnetic core of a transformer. A size of the magnetic core of the transformer is shown in Table 1, where an I sheet is a magnetic core cover. In this embodiment, a first magnetic core cover may have a same size with a second magnetic core cover. In addition, Ae in the following table indicates an effective cross-sectional area. To ensure conversion efficiency of a magnetic flux, an effective cross-sectional area (Ae of the I sheet) of the magnetic core cover is the same as or close to Ae (Ae of a first magnetic cylinder and Ae of a second magnetic cylinder) of a magnetic cylinder.

TABLE 1

| Parameters | Values | Units | Remarks |
| --- | --- | --- | --- |
| a | 15.00 | mm | Length of a magnetic core |
| b | 25.55 | mm | Width of a magnetic core |
| a1 | 13.00 | mm | Size 1 of an I sheet |
| b1 | 13.95 | mm | Size 2 of an I sheet |
| a2 | 12.00 | mm | Length of a magnetic cylinder |
| b2 | 5.80 | mm | Width of a magnetic cylinder |
| b3 | 19.75 | mm | Central distance of a magnetic cylinder |
| h1 | 1.5 | mm | Height of a magnetic core window |
| h2 | 6.00 | mm | Height of a magnetic core |
| r1 | 1.00 | mm | Chamfer of a magnetic cylinder |
| Ae3 | 67.5 | mm^2 | Ae of an I sheet |
| Ae1 | 68.74 | mm^2 | Ae of a magnetic cylinder |
| gap | 0.2 | mm | Gap of a magnetic core |
| Magnetic material | | | Ferrite with 1 MHz |

Figure 13:
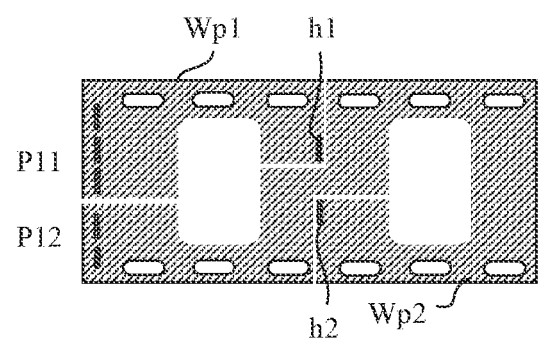
FIG. 13 is a drawing of a primary-side winding of a transformer according to an embodiment of this application.
Figure 14:
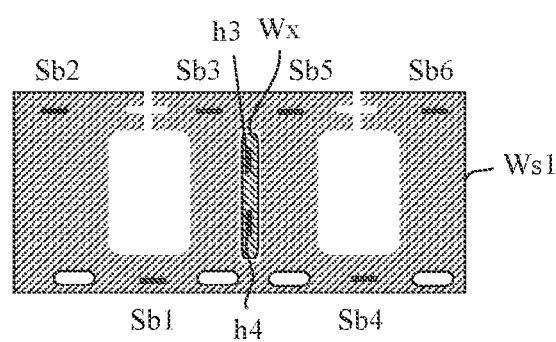
FIG. 14 is a drawing of a secondary-side winding of a transformer according to an embodiment of this application.
Figure 15:
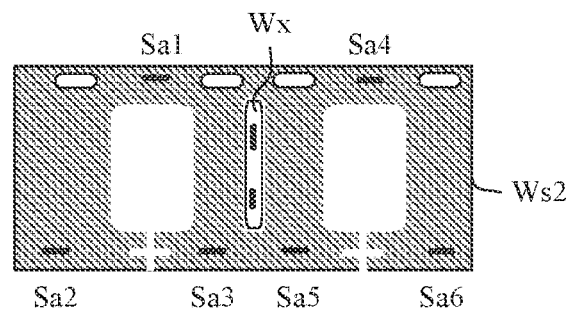
FIG. 15 is a drawing of a secondary-side winding of a transformer according to another embodiment of this application.

It should be noted that metal conducting-wire windings may be used for a primary-side winding and a secondary-side winding. In addition, PCB windings may also be used for both the primary-side winding and the secondary-side winding. FIG. 13, FIG. 14, and FIG. 15 are drawings of a primary-side winding and a secondary-side winding that are implemented by using a PCB. The primary-side winding is constituted by Wp (Wp1 and Wp2) shown in FIG. 13 and Wx shown in FIG. 14 and FIG. 15. Because chart layers shown in FIG. 13, FIG. 14, and FIG. 15 separately represent different metal layers on the PCB board, for a primary-side winding La in FIG. 5, Wp1 and Wp2 that are in FIG. 13 may be connected in series by using Wx in FIG. 14 and/or FIG. 15 to form the primary-side winding La. For example, a welding through hole h3 and a welding through hole h4 are disposed on Wx, a welding through hole h1 is disposed at a projective position on Wp1 corresponding to h3, and a welding through hole h2 is disposed at a projective position on Wp2 corresponding to h4. In this way, the welding through hole h1 and the welding through hole h3 are connected, and the welding through hole h2 and the welding through hole h4 are connected, so that Wp1 and Wp2 that are in FIG. 13 are connected. Certainly, Wp1 and Wp2 may alternatively be connected by using Wx (for example, Wx in FIG. 15) in another metal layer. A specific manner is similar to the foregoing manner, and details are not described again. As shown in FIG. 14 and FIG. 15, The secondary-side winding is constituted by Ws1 and Ws2. Specifically, referring to FIG. 14, the secondary-side winding is connected to a positive pole of C2 in FIG. 5 by using a through hole at Sb1, the secondary-side winding is connected to Q1 in FIG. 5 by using a through hole at Sb2, the secondary-side winding is connected to Q2 in FIG. 5 by using a through hole at Sb3, the secondary-side winding is connected to a positive pole of C4 in FIG. 5 by using a through hole at Sb4, the secondary-side winding is connected to Q5 in FIG. 5 by using a through hole at Sb5, and the secondary-side winding is connected to Q6 in FIG. 5 by using a through hole at Sb6. In this case, a secondary-side winding Lb1 is formed between Sb1 and Sb2, a secondary-side winding Lb2 is formed between Sb1 and Sb3, a secondary-side winding Lb5 is formed between Sb4 and Sb5, a secondary-side winding Lb5 is formed between Sb4 and Sb5, and a secondary-side winding Lb6 is formed between Sb4 and Sb6. The secondary-side winding is connected to a positive pole of C1 in FIG. 5 by using a through hole at Sa1, the secondary-side winding is connected to Q4 in FIG. 5 by using a through hole at Sa2, the secondary-side winding is connected to Q3 in FIG. 5 by using a through hole at Sa3, the secondary-side winding is connected to a positive pole of C3 in FIG. 5 by using a through hole at Sa4, the secondary-side winding is connected to Q8 in FIG. 5 by using a through hole at Sa5, and the secondary-side winding is connected to Q7 in FIG. 5 by using a through hole at Sa6. In this case, a secondary-side winding Lb4 is formed between Sa1 and Sa2, a secondary-side winding Lb3 is formed between Sa1 and Sa3, a secondary-side winding Lb8 is formed between Sa4 and Sa5, and a secondary-side winding Lb7 is formed between Sa4 and Sa6. In addition, it should be noted that FIG. 13 further shows a through hole at P11 and a through hole at P12, and the through hole at P11 and the through hole at P12 are configured to connect to a primary-side switch circuit 43. In addition, Wx is not connected to Ws1 or Ws2.

Figure 16:
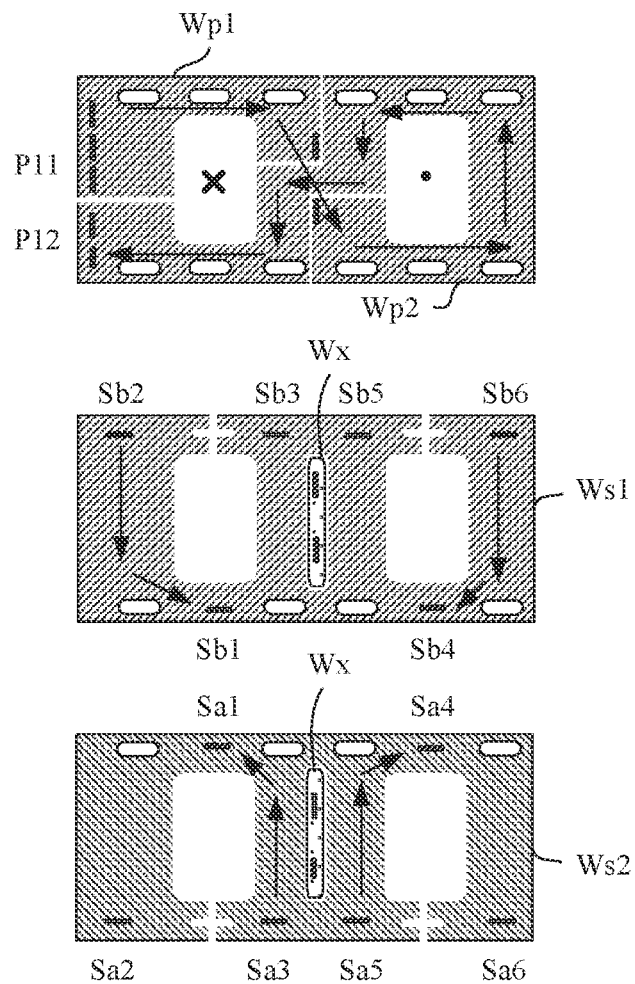
FIG. 16 is a schematic diagram of a flow direction of a working current of a transformer according to an embodiment of this application.
Figure 17:
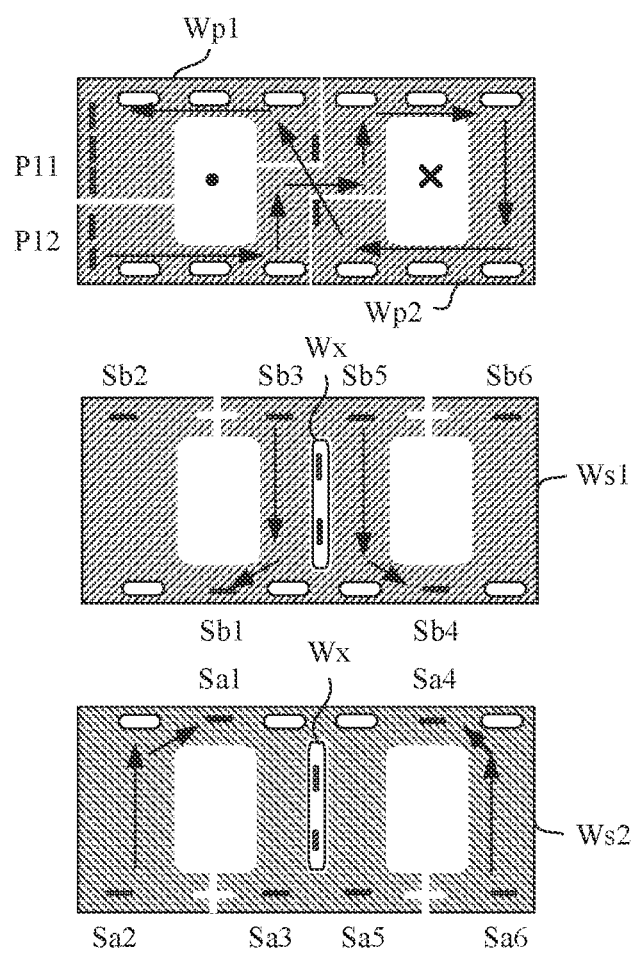
FIG. 17 is a schematic diagram of a flow direction of a working current of a transformer according to another embodiment of this application.
Figure 18:
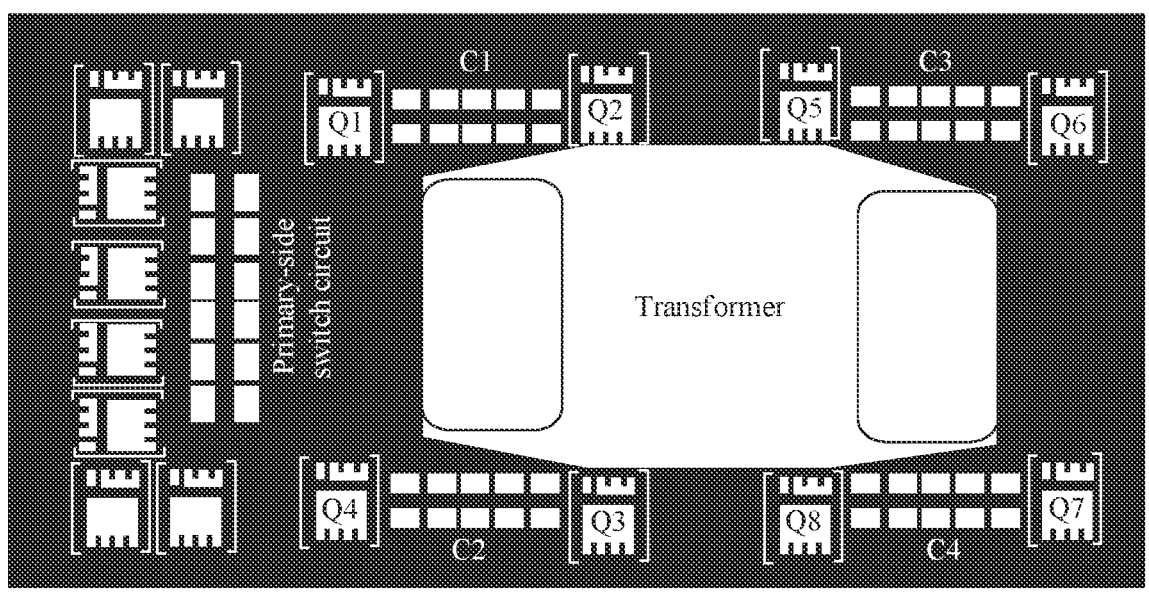
FIG. 18 is a schematic structural diagram of a layout of a power supply according to an embodiment of this application.

Design parameters of the PCB such as a specific size, a thickness, and a quantity of turns are shown in Table 2. Directions of working currents of two half cycles are shown in FIG. 16 and FIG. 17. Referring to FIG. 16, in one half cycle, the flow direction of the current in a primary-side winding La is from P11 to P12, and the flow directions in a secondary-side winding are from Sb2 to Sb1, from Sa3 to Sa1, from Sa5 to Sa4, and from Sb6 to Sb4. Referring to FIG. 17, in the other half cycle, the flow direction of the current in the primary-side winding is from P12 to P11, and the flow directions in the secondary-side winding are from Sa2 to Sa1, from Sb3 to Sb1, from Sb5 to Sb4, and from Sa6 to Sa4. FIG. 18 is a structural diagram of a layout of a power supply. A primary-side switch circuit is arranged on a left side of a magnetic core of a transformer, and secondary-side rectifier circuits are arranged on the upper side of the magnetic core of the transformer and the lower side of the magnetic core of the transformer. The foregoing P11 and the foregoing P12 are through holes through which the primary-side winding is connected to the primary-side switch circuit; and Sa1 to Sa6 and Sb1 to Sb6 are through holes through which the secondary-side winding is connected to a secondary-side filter circuit. Certainly, FIG. 13, FIG. 14, and FIG. 15 are described by using only the primary-side winding and the secondary-side winding that are shown in a drawing of one PCB layer as an example. It may be understood that, to increase a current capacity of the winding, a plurality of PCB layers that are the same may be connected in parallel to be used as the primary-side winding and the secondary-side winding. For example, the plurality of PCB layers that are shown in FIG. 13 and that are connected in parallel are used as the primary-side winding, and Wp in all layers are connected in parallel; the plurality of PCB layers that are shown in FIG. 14 and that are connected in parallel are used as the secondary-side winding, and Ws1 in all layers are connected in parallel; and the plurality of PCB layers that are shown in FIG. 15 and that are connected in parallel are used as the secondary-side winding, and Ws2 in all layers are connected in parallel. Parameters of a PCB winding are shown in the following Table 2.

TABLE 2

| Specifications | Values |
|---|---|
| PCB length | 76.00 mm |
| PCB width | 25.40 mm |
| PCB thickness | 2.5 mm |
| PCB layer quantity | 16 layers |
| PCB copper thickness | 20 oz |

Based on the foregoing parameters, it can be learned from measured data that an equivalent direct current resistance DCR (a resistance at 20 Hz) of a PCB planar transformer is 1.27, an ACR (a resistance at 0.9 MHz) is 6.54, and an ACR (a resistance at 1.0 MHz) is 6.63, a copper loss may be reduced by approximately 50%, and an overall efficiency may be expected to exceed 98%.

Figure 19:
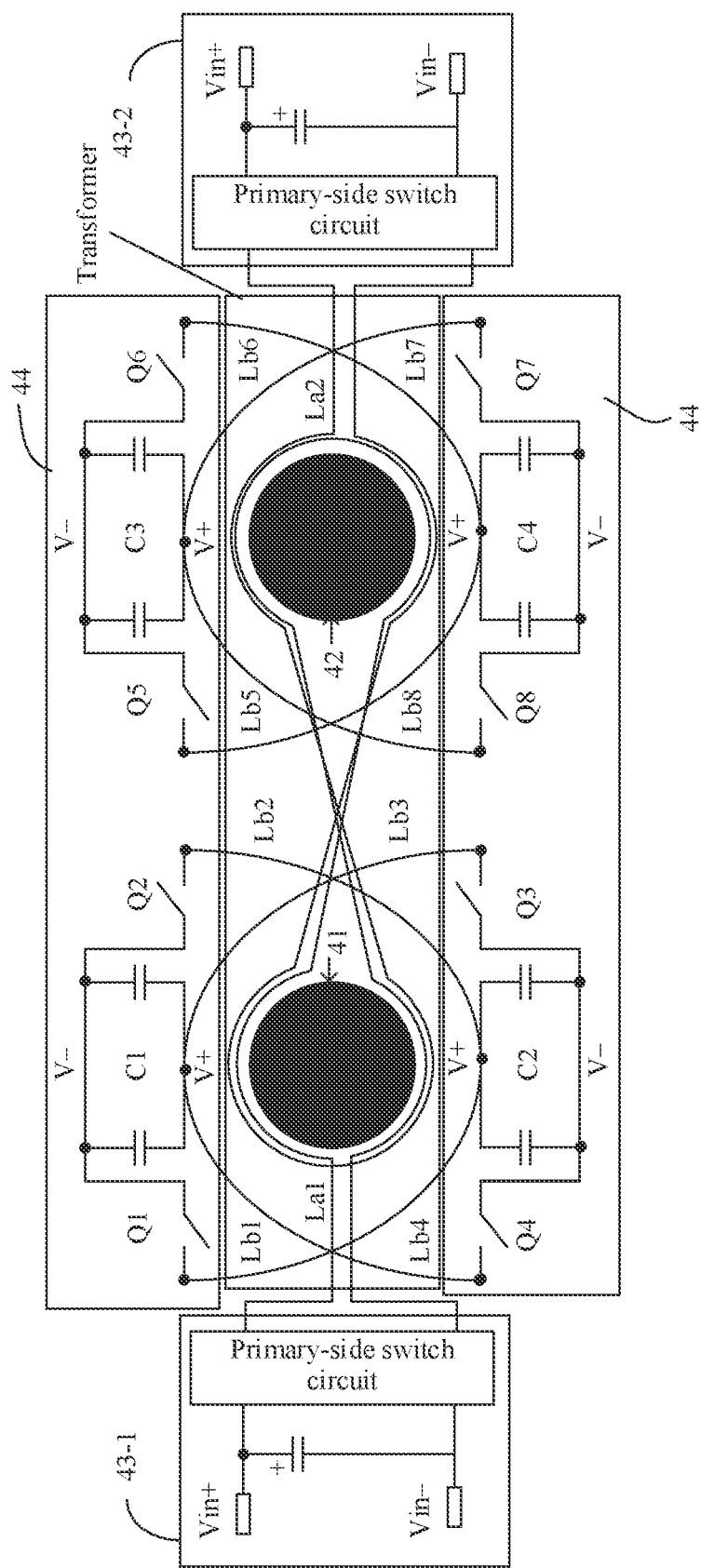
FIG. 19 is a view of a transformer in a top view of a magnetic core according to still another embodiment of this application.

In addition, FIG. 19 is a view of a transformer in a top view of a magnetic core. The transformer may further include two primary-side windings. In this case, a first primary-side winding La1 and a second primary-side winding La2 are wound around a first magnetic cylinder 41, and the first primary-side winding La1 and the second primary-side winding La2 are wound around a second magnetic cylinder 42. When a first primary-side switch circuit 43-1 of the first primary-side winding La1 supplies power to the first primary-side winding La1, and a second primary-side switch circuit 43-2 of the second primary-side winding La2 supplies power to the second primary-side winding La2, a direction of a magnetic flux generated by the first primary-side winding La1 on the first magnetic cylinder 41 is the same as a direction of a magnetic flux generated by the second primary-side winding La2 on the second magnetic cylinder 42.

In other words, the first primary-side winding La1 is separately wound around two magnetic cylinders in opposite directions, to form one turn of winding on the first magnetic cylinder 41 and one turn of winding on the second magnetic cylinder 42. Directions of magnetic fluxes generated on the two turns of windings wound around the respective magnetic cylinders are the same. The second primary-side winding La2 is separately wound around the two magnetic cylinders in opposite directions, to form one turn of winding on the first magnetic cylinder 41 and one turn of winding on the second magnetic cylinder 42. Directions of magnetic fluxes generated on the two turns of windings wound around the respective magnetic cylinders are the same. In addition, a direction of the magnetic flux generated on the first primary-side winding La1 wound around on the first magnetic cylinder 41 and the second magnetic cylinder 42 is the same as a direction of the magnetic flux generated on the second primary-side winding La2 wound around on the first magnetic cylinder 41 and the second magnetic cylinder 42. To provide more uniform heat dissipation distribution, the first primary-side switch circuit 43-1 is located on a side that is of the first magnetic cylinder 41 and that is away from the second magnetic cylinder 42, that is, on a left side of the transformer shown in FIG. 13; and the second primary-side switch circuit 43-2 is located on a side that is of the second magnetic cylinder 42 and that is away from the first magnetic cylinder 41, that is, on a right side of the transformer shown in FIG. 13.

In this way, referring to FIG. 19, the first primary-side winding La1 that leads out from a left side of the magnetic core is wound around the two magnetic cylinders in the opposite directions to form two turns of primary-side windings. As shown in FIG. 19, directions of magnetic fluxes generated by the two turns of the windings on the magnetic core are the same. A first primary-side winding La1 and the first primary-side switch circuit 43-1 form a first power loop at a primary side. A second primary-side winding La2 that leads out from a right side of the magnetic core is wound around the two magnetic cylinders in opposite directions to form two turns of primary-side windings. The directions of the magnetic fluxes generated by the two turns of the windings on the magnetic core are the same. The second primary-side winding La2 and the second primary-side switch circuit 43-2 form a second power loop at the primary side. The first power loop at the primary side and the second power loop at the primary side are connected in parallel to synchronously work, and have same and synchronous directions of magnetic fluxes. Secondary-side switches Q1, Q3, Q6, and Q8, secondary-side windings Lb1, Lb3, Lb6, and Lb8 that are respectively connected to Q1, Q3, Q6, and Q8, and capacitor groups C1, C2, C3, and C4 that are respectively connected to Q1, Q3, Q6, and Q8 form a half-cycle power loop at a secondary side. Secondary-side switches Q2, Q4, Q5, and Q7, secondary-side windings Lb2, Lb4, Lb5, and Lb7 that are respectively connected to Q2, Q4, Q5, and Q7, and the capacitor groups C1, C2, C3, and C4 that are respectively connected to Q2, Q4, Q5, and Q7 form the other half-cycle power loop at the secondary side. The two half-cycle power loops at the secondary side work alternately with a current of the power loop at the primary side. The capacitor groups C1, C2, C3, and C4 are connected in parallel to output a load current.

Figure 20:
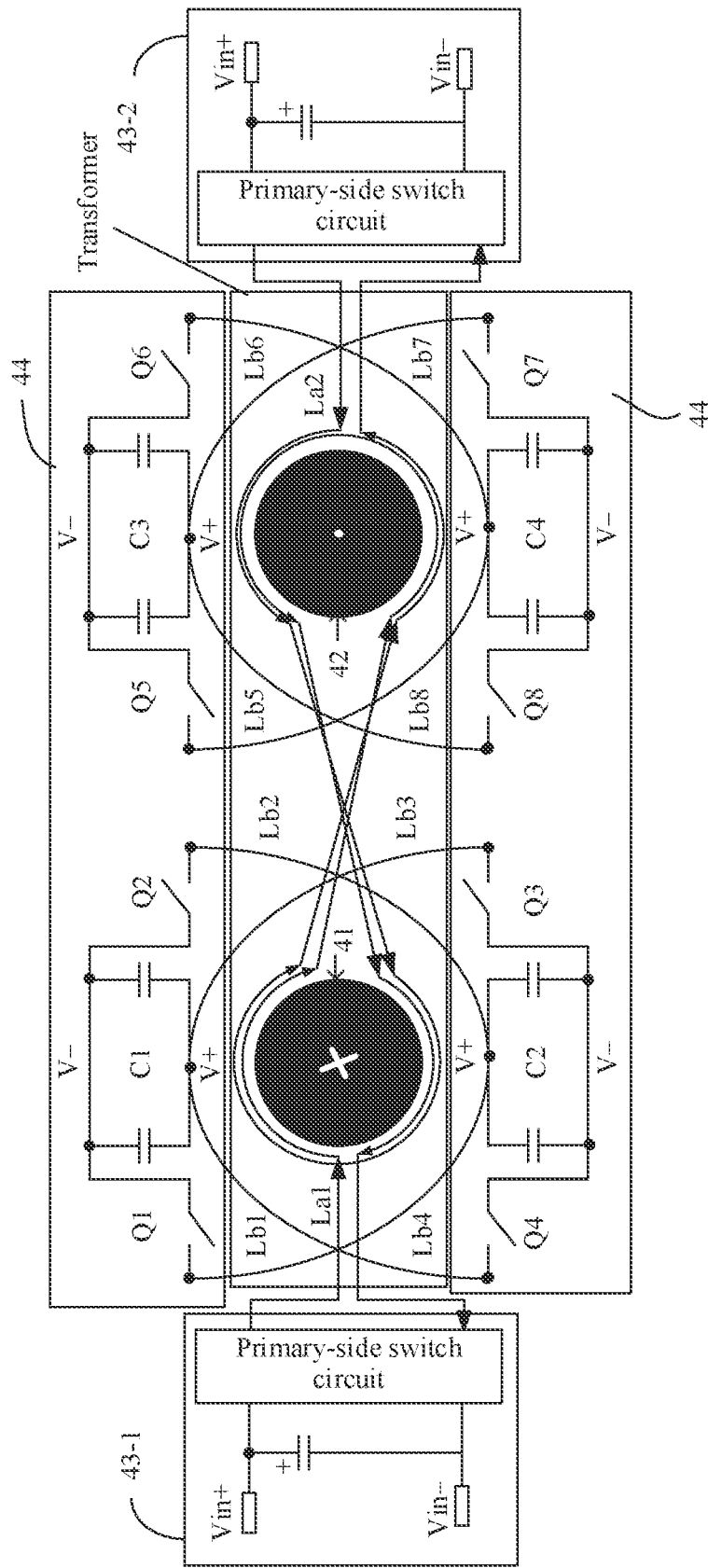
FIG. 20 is a schematic diagram of a working current of the transformer shown in FIG. 19 according to an embodiment of this application.
Figure 21:
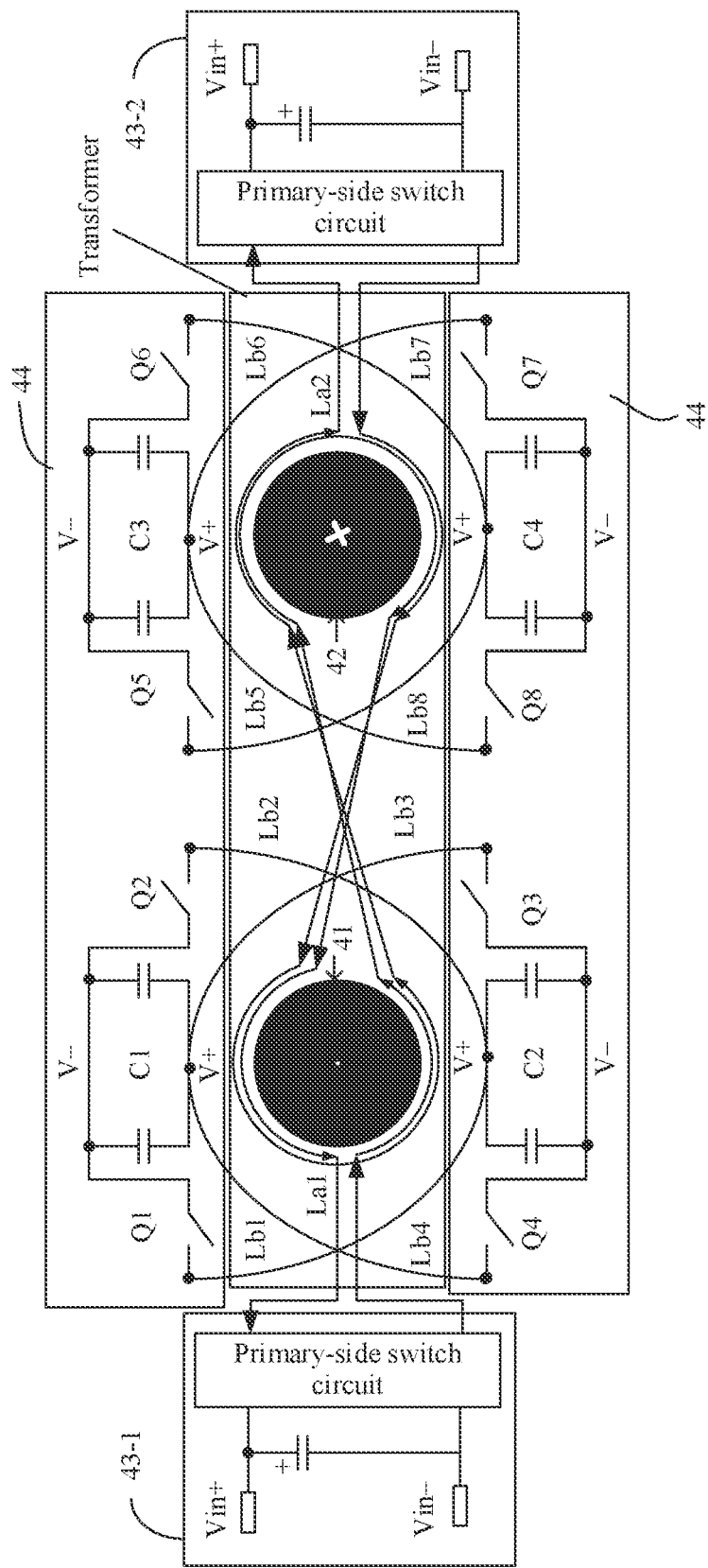
FIG. 21 is a schematic diagram of a working current of the transformer shown in FIG. 19 according to another embodiment of this application.

Working currents of the two half-cycle power loops are shown in FIG. 20 and FIG. 21.

Referring to FIG. 20, when a direction in which the first primary-side switch circuit 43-1 supplies power to the primary-side winding La1 is a first direction, and a direction in which the second primary-side switch circuit 43-2 supplies power to the primary-side winding La2 is the first direction, a current of the first primary-side winding La1 and a current of the second primary-side winding La2 flow around the first magnetic cylinder 41 on a left side in a clockwise direction, and flow around the second magnetic cylinder 42 on a right side in a counterclockwise direction, so that a direction of a magnetic flux generated on the first magnetic cylinder 41 is perpendicular to paper inward (for example, indicated by a symbol x at a center of the first magnetic cylinder 41 in FIG. 20), and a direction of a magnetic flux generated on the second magnetic cylinder 42 is perpendicular to paper outward (for example, indicated by a dot at a center of the second magnetic cylinder 42 in FIG. 20). Directions of magnetic fluxes in a loop constituted by coupling the two magnetic cylinders are the same. That is, as shown in FIG. 7, the directions of the magnetic fluxes on the two magnetic cylinders are both counterclockwise directions. The switches Q1, Q3, Q6, and Q8 are turned on, and Q2, Q4, Q5, and Q7 are turned off. In a power loop that is constituted by the switches Q1 and Q3, two secondary-side windings that are respectively connected to Q1 and Q3, and the capacitor groups C1 and C2, a current flows in a counterclockwise direction; and in a power loop that is constituted by the switches Q6 and Q8, two secondary-side windings that are respectively connected to Q6 and Q8, and the capacitor groups C3 and C4, a current flows in a clockwise direction.

Referring to FIG. 21, when a direction in which the first primary-side switch circuit 43-1 supplies power to the primary-side winding La1 is a second direction, and a direction in which the second primary-side switch circuit 43-2 supplies power to the primary-side winding La2 is the second direction, a current of the first primary-side winding La1 and a current of the second primary-side winding La2 flow around the first magnetic cylinder 41 on a left side in a counterclockwise direction, so that a direction of a magnetic flux generated on the first magnetic cylinder 41 on the left side is perpendicular to paper outward (for example, indicated by a symbol at a center of the first magnetic cylinder 41 in FIG. 11), and a direction of a magnetic flux generated on the second magnetic cylinder 42 on the right side is perpendicular to paper inward (for example, indicated by a symbol x at a center of the second magnetic cylinder 42 in FIG. 11). Directions of magnetic fluxes in the loop constituted by coupling the two magnetic cylinders are the same. That is, as shown in FIG. 8, the directions of the magnetic fluxes on the two magnetic cylinders are both clockwise directions. The switches Q1, Q3, Q6, and Q8 are turned off, and Q2, Q4, Q5, and Q7 are turned on. In a power loop that is constituted by the switches Q2 and Q4, two secondary-side windings that are respectively connected to Q2 and Q4, and the capacitor groups C1 and C2, a current flows in a clockwise direction; and in a power loop that is constituted by the switches Q5 and Q7, two secondary-side windings that are respectively connected to Q5 and Q7, and the capacitor groups C3 and C4, a current flows in a counterclockwise direction.

When the primary-side winding and the secondary-side winding are implemented by using a PCB, a drawing of the first primary-side winding and a drawing of the second primary-side winding are similar to the drawing in FIG. 13. Drawings of the secondary-side windings are similar to the drawing in FIG. 14 and the drawing in FIG. 15. In addition, design parameters of the PCB such as a specific size, a thickness, and a quantity of layers may also refer to Table 2.

Figure 22:
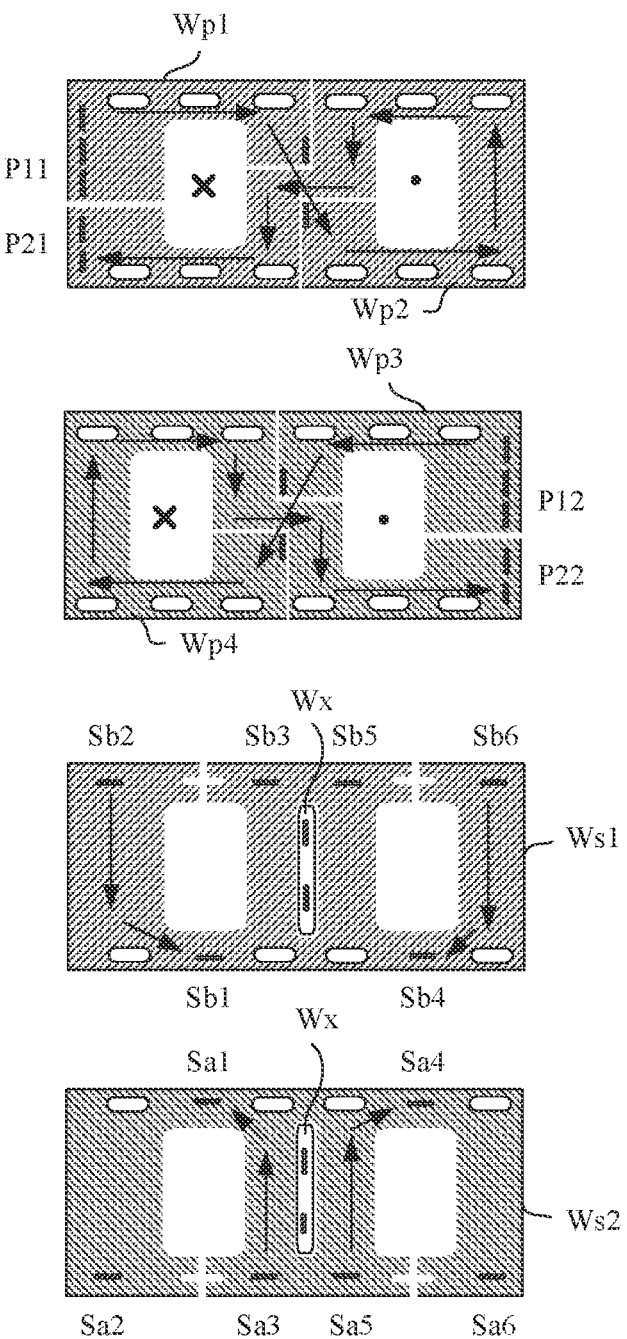
FIG. 22 is a schematic diagram of a flow direction of a working current of a transformer according to still another embodiment of this application.
Figure 23:
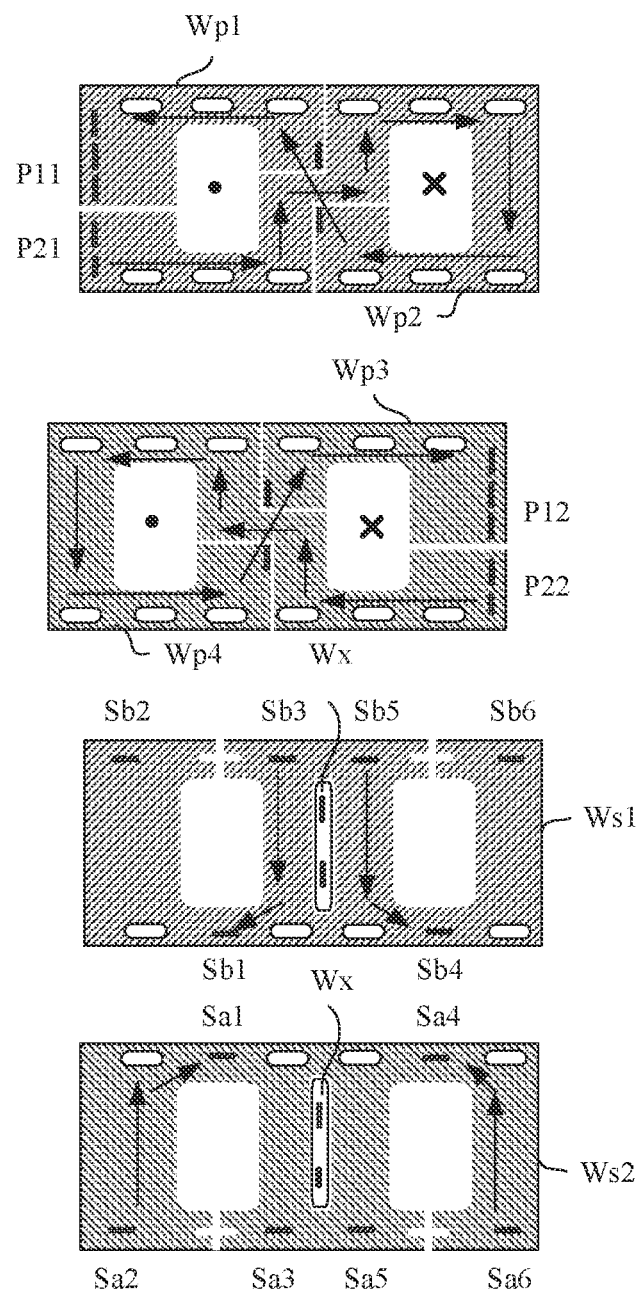
FIG. 23 is a schematic diagram of a flow direction of a working current of a transformer according to yet another embodiment of this application.
Figure 24:
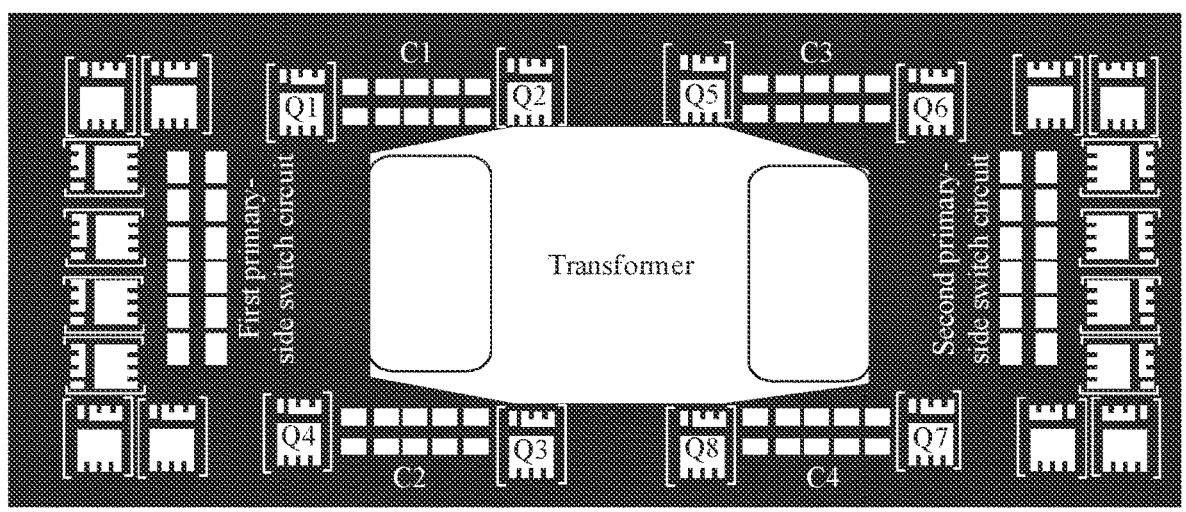
FIG. 24 is a schematic structural diagram of a layout of a power supply according to another embodiment of this application.

Flow directions of working currents of two half-cycle power loops on a PCB are shown in FIG. 22 and FIG. 23. Wp1 and Wp2 located on a same layer are connected by using Wx (for example, Wx of a layer on which Ws1 is located) of another layer to form a first primary-side winding La1. Wp3 and Wp4 located on a same layer are connected by using Wx (for example, Wx of a layer on which Ws2 is located) of another layer to form a second primary-side winding La2. Referring to FIG. 22 and FIG. 23, both central positions of PCB layers on which Ws1 and Wx2 are located include Wx. It can be learned that a welding through hole is disposed on Wx. A function of the welding through hole refers to descriptions in FIG. 13 and FIG. 14. Details are not described herein again, in addition, Wx is not connected to Ws1 or Ws2. In one half cycle, a flow direction of the current in the first primary-side winding La1 is from P11 to P21, and a flow direction of the current in the second primary-side winding La2 is from P12 to P22; and the flow directions in the secondary-side winding are from Sb2 to Sb1, from Sa3 to Sa1, from Sa5 to Sa4, and from Sb6 to Sb4. In the other half cycle, a flow direction of the current in the first primary-side winding La1 is from P21 to P11, and a flow direction of the current in the second primary-side winding La2 is from P22 to P12; and the flow directions in the secondary-side winding are from Sa2 to Sa1, from Sb3 to Sb1, from Sb5 to Sb4, and from Sa6 to Sa4. A diagram of a layout of a power supply is shown in FIG. 24. A first primary-side switch circuit 43-1 is arranged on the left side of a magnetic core of a transformer, a second primary-side switch circuit 43-2 is arranged on the right side of the magnetic core of the transformer, and secondary-side rectifier circuits 44 are arranged on the upper side of the magnetic core of the transformer and the lower side of the magnetic core of the transformer. The forgoing P11 and the foregoing P21 are through holes through which the first primary-side winding is connected to the primary-side switch circuit; P12 and P22 are through holes through which the second primary-side winding is connected to the primary-side switch circuit; and Sa1 to Sa6 and Sb1 to Sb6 are through holes through which the secondary-side winding is connected to a secondary-side filter circuit.

Based on the parameters in Table 1 and Table 2, it can be learned from the measured data of the transformer provided in FIG. 18 that, the DCR (20 Hz) of the PCB planar transformer is 1.27, the ACR (0.9 MHz) is 6.54, and the ACR (1.0 MHz) is 6.63. The copper loss may be reduced by approximately 50%, and the overall efficiency may be expected to exceed 98%. In addition, because the two primary-side windings are respectively disposed on two sides of the magnetic core, thermal balance on a board is better.

Figure 25:
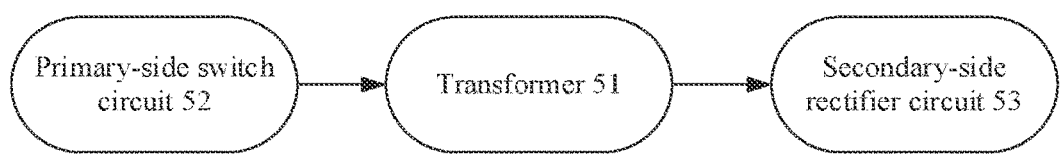
FIG. 25 is a schematic structural diagram of a power supply according to an embodiment of this application.

As shown in FIG. 25, a power supply is provided, including a foregoing transformer 51, a primary-side switch circuit 52 that is connected to a primary-side winding of the transformer 51, and a secondary-side rectifier circuit 53 that is connected to a secondary-side winding of the transformer 51. Certainly, as shown in FIG. 1, the power supply may further include other structures such as an input filtering and protection component and a control and detection component. Details are not described in this application again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A transformer, comprising:
   a magnetic core comprising a first magnetic cylinder and a second magnetic cylinder, one end of the first magnetic cylinder is coupled to one end of the second magnetic cylinder and the other end of the first magnetic cylinder is coupled to the other end of the second magnetic cylinder, to form an annulus;

one or more primary-side windings are wound around the first magnetic cylinder and the second magnetic cylinder, and the one or more primary-side windings are connected to a first primary-side switch circuit; when the first primary-side switch circuit supplies power to the one or more primary-side windings, a magnetic flux is generated around the one or more primary-side windings on the first magnetic cylinder and the second magnetic cylinder; and a direction of a magnetic flux generated on the first magnetic cylinder is the same as a direction of a magnetic flux generated on the second magnetic cylinder;

a fractional turn of a first secondary-side winding is separately wound around the first magnetic cylinder and the second magnetic cylinder, the first secondary-side winding is configured to induce the magnetic flux on the first magnetic cylinder or the second magnetic cylinder to generate a current;

wherein the first secondary-side winding is connected to a secondary-side rectifier circuit, wherein the secondary-side rectifier circuit comprises a first switch, a second switch, a third switch, a fourth switch, a fifth switch, a sixth switch, a seventh switch, an eighth switch, and four capacitor groups, wherein each capacitor group comprises at least one capacitor or at least two capacitors connected in parallel;

the first secondary-side winding, a second secondary-side winding, a third secondary-side winding, and a fourth secondary-side winding are wound around the first magnetic cylinder, wherein one end of the first secondary-side winding is connected to a positive pole of a second capacitor group, and the other end of the first secondary-side winding is connected to a negative pole of a first capacitor group by using the first switch, one end of the second secondary-side winding is connected to the positive pole of the second capacitor group, and the other end of the second secondary-side winding is connected to the negative pole of the first capacitor group by using the second switch, one end of the third secondary-side winding is connected to a positive pole of the first capacitor group, and the other end of the third secondary-side winding is connected to a negative pole of the second capacitor group by using the third switch, and one end of the fourth secondary-side winding is connected to the positive pole of the first capacitor group, and the other end of the fourth secondary-side winding is connected to the negative pole of the second capacitor group by using the fourth switch; and a fifth secondary-side winding, a sixth secondary-side winding, a seventh secondary-side winding, and an eighth secondary-side winding are wound around the second magnetic cylinder, wherein one end of the fifth secondary-side winding is connected to a positive pole of a fourth capacitor group, and the other end of the fifth secondary-side winding is connected to a negative pole of a third capacitor group by using the fifth switch, one end of the sixth secondary-side winding is connected to the positive pole of the fourth capacitor group, and the other end of the sixth secondary-side winding is connected to the negative pole of the third capacitor group by using the sixth switch, one end of the seventh secondary-side winding is connected to a positive pole of the third capacitor group, and the other end of the seventh secondary-side winding is connected to a negative pole of the fourth capacitor group by using the seventh switch, and one end of the eighth secondary-side winding is connected to the positive pole of the third capacitor group, and the other end of the eighth secondary-side winding is connected to the negative pole of the fourth capacitor group by using the eighth switch.

2. The transformer according to claim 1, wherein when a direction in which the first primary-side switch circuit supplies power to the one or more primary-side windings is a first direction, the first switch, the third switch, the sixth switch, and the eighth switch are turned on; and when the direction in which the first primary-side switch circuit supplies power to the one or more primary-side windings is a second direction, the second switch, the fourth switch, the fifth switch, and the seventh switch are turned on, wherein the first direction is opposite to the second direction.

3. The transformer according to claim 1, wherein the one or more primary-side windings is a printed circuit board winding or a metal conducting-wire.

4. The transformer according to claim 1, wherein the magnetic core further comprises a first magnetic core cover and a second magnetic core cover, wherein the first magnetic cylinder and the second magnetic cylinder are disposed between the first magnetic core cover and the second magnetic core cover; one end of the first magnetic cylinder is connected to the first magnetic core cover, and the other end of the first magnetic cylinder is connected to the second magnetic core cover; and one end of the second magnetic cylinder is connected to the first magnetic core cover, and the other end of the second magnetic cylinder is connected to the second magnetic core cover.

5. A power supply, comprising the transformer according to claim 4.

6. The transformer according to claim 1, wherein a first primary-side winding and a second primary-side winding of the one or more primary side windings are wound around the first magnetic cylinder, and the first primary-side winding and the second primary-side winding are wound around the second magnetic cylinder; and when the first primary-side switch circuit supplies power to the first primary-side winding, and a second primary-side switch circuit supplies power to the second primary-side winding, a direction of a magnetic flux generated by the first primary-side winding on the first magnetic cylinder is the same as a direction of a magnetic flux generated by the second primary-side winding on the second magnetic cylinder.

7. The transformer according to claim 6, wherein the first primary-side switch circuit is located on a side of the first magnetic cylinder that is away from the second magnetic cylinder, and the second primary-side switch circuit is located on a side of the second magnetic cylinder that is away from the first magnetic cylinder.

8. The transformer according to claim 1, wherein the one or more primary-side windings is separately wound one turn around the first magnetic cylinder and the second magnetic cylinder.

9. The transformer according to claim 1, wherein the first secondary-side winding is a printed circuit board winding or a metal conducting-wire.

* * * * *